United States Patent
Koga

(10) Patent No.: US 9,905,049 B2
(45) Date of Patent: Feb. 27, 2018

(54) TERMINAL, INFORMATION PROCESSING APPARATUS, DISPLAY CONTROL METHOD, AND STORAGE MEDIUM

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/601,624

(22) Filed: Jan. 21, 2015

(65) Prior Publication Data

US 2015/0221134 A1 Aug. 6, 2015

(30) Foreign Application Priority Data

Feb. 6, 2014 (JP) ................................ 2014-021589

(51) Int. Cl.
G06T 19/00 (2011.01)

(52) U.S. Cl.
CPC .. G06T 19/006 (2013.01); *G06T 2207/10004* (2013.01)

(58) Field of Classification Search
CPC .. G06T 19/006; G06K 7/1404; G06K 7/1408; G06K 7/1413; G06K 7/1417; G06K 7/1421
See application file for complete search history.

(56) References Cited

U.S. PATENT DOCUMENTS

| | | | |
|---|---|---|---|
| 8,542,906 B1 | 9/2013 | Persson et al. | |
| 9,269,011 B1 | 2/2016 | Sikka et al. | |
| 2002/0052709 A1 | 5/2002 | Akatsuka et al. | |
| 2002/0191862 A1 | 12/2002 | Neumann et al. | |
| 2004/0008906 A1 | 1/2004 | Webb | |
| 2004/0109009 A1 | 6/2004 | Yonezawa et al. | |
| 2004/0183917 A1 | 9/2004 | Von Flotow et al. | |
| 2005/0004774 A1 | 1/2005 | Volk et al. | |

(Continued)

FOREIGN PATENT DOCUMENTS

| | | |
|---|---|---|
| JP | 2003-281297 A | 10/2003 |
| JP | 2007-249516 | 9/2007 |

(Continued)

OTHER PUBLICATIONS

U.S. Office Action dated May 9, 2016, issued in U.S. Appl. No. 14/244,244.

(Continued)

*Primary Examiner* — King Poon
*Assistant Examiner* — Vincent Peren
(74) *Attorney, Agent, or Firm* — Oblon, McClelland, Maier & Neustadt, L.L.P.

(57) ABSTRACT

A terminal includes a processor configured to execute a process that includes determining whether a reference object is included in an input image, determining whether first characteristic information of the input image includes second characteristic information that is associated with identification information of the reference object, and generating an image in which a content associated with the identification information of the reference object is superimposed on the input image based on a result of the determining that the first characteristic information includes the second characteristic information.

9 Claims, 24 Drawing Sheets

(56) References Cited

U.S. PATENT DOCUMENTS

| | | |
|---|---|---|
| 2005/0081161 A1 | 4/2005 | MacInnes |
| 2006/0017832 A1 | 1/2006 | Kemppinen |
| 2007/0038944 A1 | 2/2007 | Carignano |
| 2007/0118739 A1 | 5/2007 | Togashi et al. |
| 2008/0024392 A1 | 1/2008 | Gustafsson et al. |
| 2008/0071559 A1 | 3/2008 | Arrasvuori |
| 2008/0266323 A1 | 10/2008 | Biocca |
| 2008/0291269 A1 | 11/2008 | Hong et al. |
| 2008/0298688 A1* | 12/2008 | Cheong ............... G06K 7/14 382/224 |
| 2008/0310686 A1 | 12/2008 | Kretz |
| 2009/0014514 A1 | 1/2009 | Hatori et al. |
| 2010/0048290 A1 | 2/2010 | Baseley |
| 2011/0134108 A1* | 6/2011 | Hertenstein ......... G06T 19/006 345/419 |
| 2011/0148924 A1 | 6/2011 | Tapley |
| 2011/0159957 A1 | 6/2011 | Kawaguchi |
| 2011/0234631 A1 | 9/2011 | Kim |
| 2012/0075285 A1 | 3/2012 | Oyagi et al. |
| 2012/0075343 A1* | 3/2012 | Chen ...................... G09G 5/397 345/633 |
| 2012/0123828 A1 | 5/2012 | Pahls et al. |
| 2012/0131529 A1 | 5/2012 | Hayakawa et al. |
| 2012/0162257 A1* | 6/2012 | Kim .................... H04L 63/123 345/633 |
| 2012/0210255 A1 | 8/2012 | Ooi et al. |
| 2012/0211555 A1* | 8/2012 | Rowe .................. G06K 7/1404 235/375 |
| 2012/0224068 A1 | 9/2012 | Sweet, III |
| 2012/0249588 A1* | 10/2012 | Tison ................... G06F 1/1696 345/633 |
| 2012/0327117 A1 | 12/2012 | Weller |
| 2013/0002717 A1* | 1/2013 | Deffeyes ............. G06T 19/006 345/633 |
| 2013/0038633 A1* | 2/2013 | Maggiore ............ B01D 65/104 345/633 |
| 2013/0038759 A1 | 2/2013 | Jo et al. |
| 2013/0044130 A1 | 2/2013 | Geisner et al. |
| 2013/0076790 A1* | 3/2013 | Lefevre ..................... G06T 7/20 345/633 |
| 2013/0127906 A1* | 5/2013 | Sugita .................... G06T 7/001 345/633 |
| 2013/0147839 A1* | 6/2013 | Fukushima ........... G06T 19/006 345/633 |
| 2013/0195340 A1 | 8/2013 | Iwase et al. |
| 2013/0208005 A1 | 8/2013 | Kasahara et al. |
| 2013/0278635 A1* | 10/2013 | Maggiore ............. G06T 19/006 345/633 |
| 2013/0291079 A1 | 10/2013 | Lowe et al. |
| 2013/0314407 A1 | 11/2013 | Meehan |
| 2014/0002443 A1 | 1/2014 | Cunningham |
| 2014/0022281 A1* | 1/2014 | Georgeson ............ B64F 5/0045 345/633 |
| 2014/0028716 A1 | 1/2014 | Yeh |
| 2014/0123507 A1 | 5/2014 | Gupta |
| 2014/0183254 A1* | 7/2014 | Htay .................... H04L 41/0869 235/375 |
| 2014/0210856 A1* | 7/2014 | Finn ..................... G01C 15/002 345/633 |
| 2014/0225919 A1 | 8/2014 | Kaino |
| 2014/0247278 A1* | 9/2014 | Samara ............... G06K 17/0016 345/633 |
| 2014/0279242 A1 | 9/2014 | Staicut et al. |
| 2015/0009285 A1 | 1/2015 | Morishima |
| 2015/0187108 A1 | 7/2015 | Mullins |
| 2015/0235425 A1* | 8/2015 | Koga .................... G06T 19/006 345/633 |
| 2015/0277686 A1 | 10/2015 | Laforge et al. |

FOREIGN PATENT DOCUMENTS

| | | |
|---|---|---|
| JP | 2009-259127 A | 11/2009 |
| JP | 2010-219879 A | 9/2010 |
| JP | 2010-531089 | 9/2010 |
| JP | 2012-146300 | 8/2012 |
| JP | 2012-187236 | 10/2012 |
| JP | 2012-215989 A | 11/2012 |
| JP | 2013-105258 | 5/2013 |
| JP | 2013-141049 | 7/2013 |
| WO | WO 2005/119539 A1 | 12/2005 |

OTHER PUBLICATIONS

U.S. Office Action dated Oct. 23, 2015 in co-pending U.S. Appl. No. 14/244,244.

Extended European Search Report dated Sep. 4, 2014 in Patent Application No. 14163837.9.

Tapio Salonen, et al., "Demonstration of Assembly Work Using Augmented Reality" $6^{th}$ ACM International Conference on Image and Video Retrieval, XP055136773, Jul. 2007, 4 Pages.

Michael Rohs, "Marker-Based Interaction Techniques for Camera-Phones" $2^{nd}$ Workshop on Multi-User and Ubiquitous User Interfaces, XP002534869, Jan. 2005, 2 Pages.

Michael Rohs, "Marker-Based Embodied Interaction for Handheld Augmented Reality Games" Journal of Virtual Reality and Broadcasting, vol. 4, No. 5, XP055136655, May 2007, 12 Pages.

Gun A. Lee, et al., "Occlusion based Interaction Methods for Tangible Augmented Reality Environments" Proceedings of the 2004 ACM Siggraph International Conference on Virtual Reality Continuum and its Applications in Industry, XP055005457, Jan. 2004, pp. 419-426.

Japanese Office Action dated Aug. 15, 2017 for Japanese Patent Application No. 2014-021589 (with machine generated English translation) 7 pages.

Office Action dated Apr. 28, 2017, issued with respect to related U.S. Appl. No. 14/244,244, 17 pages.

Office Action dated Apr. 21, 2017 issued with respect to the related U.S. Appl. No. 14/600,530 (20 pages).

Office Action dated Nov. 4, 2016 issued with respect to related U.S. Appl. No. 14/600,530.

Office Action dated Oct. 18, 2016 in Japanese Patent Application No. 2013-089856 (with English language translation).

Office Action dated Sep. 5, 2016 issued with respect to the related Chinese Patent Application No. 201410162979.2 (With English Translation).

U.S. Office Action dated Oct. 26, 2016, issued in related U.S. Appl. No. 14/244,244.

U.S. Office Action dated May 11, 2016, issued in U.S. Appl. No. 14/600,530.

Office Action dated Apr. 18, 2017 issued with respect to the related Japanese Patent Application No. 2013-089856 with Full machine generated English translation, 8 pages.

Office Action dated Dec. 23, 2016 issued with respect to related European Patent Application No. 14163837.9.

Office Action dated Nov. 2, 2017 issued in related U.S. Appl. No. 14/600,530, 19 pages.

* cited by examiner

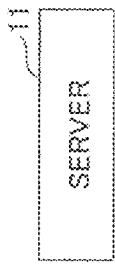
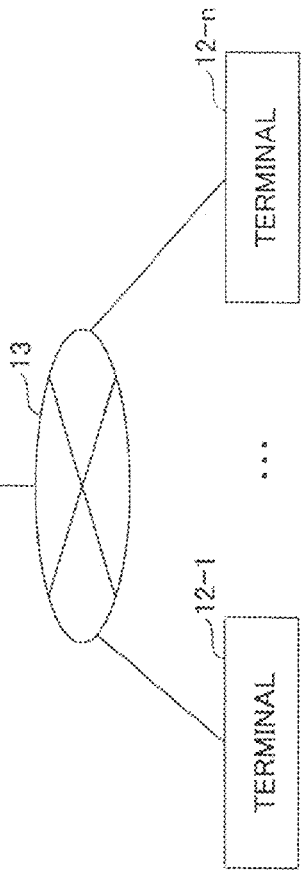
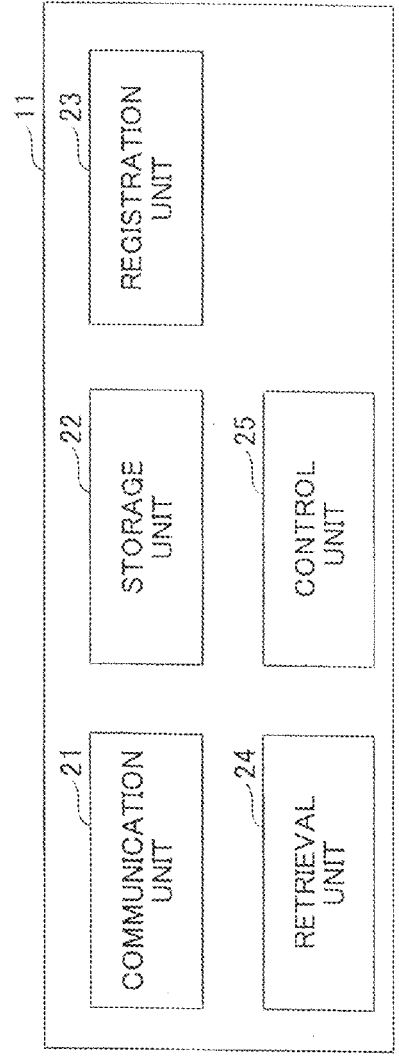
FIG.1
FIG.2

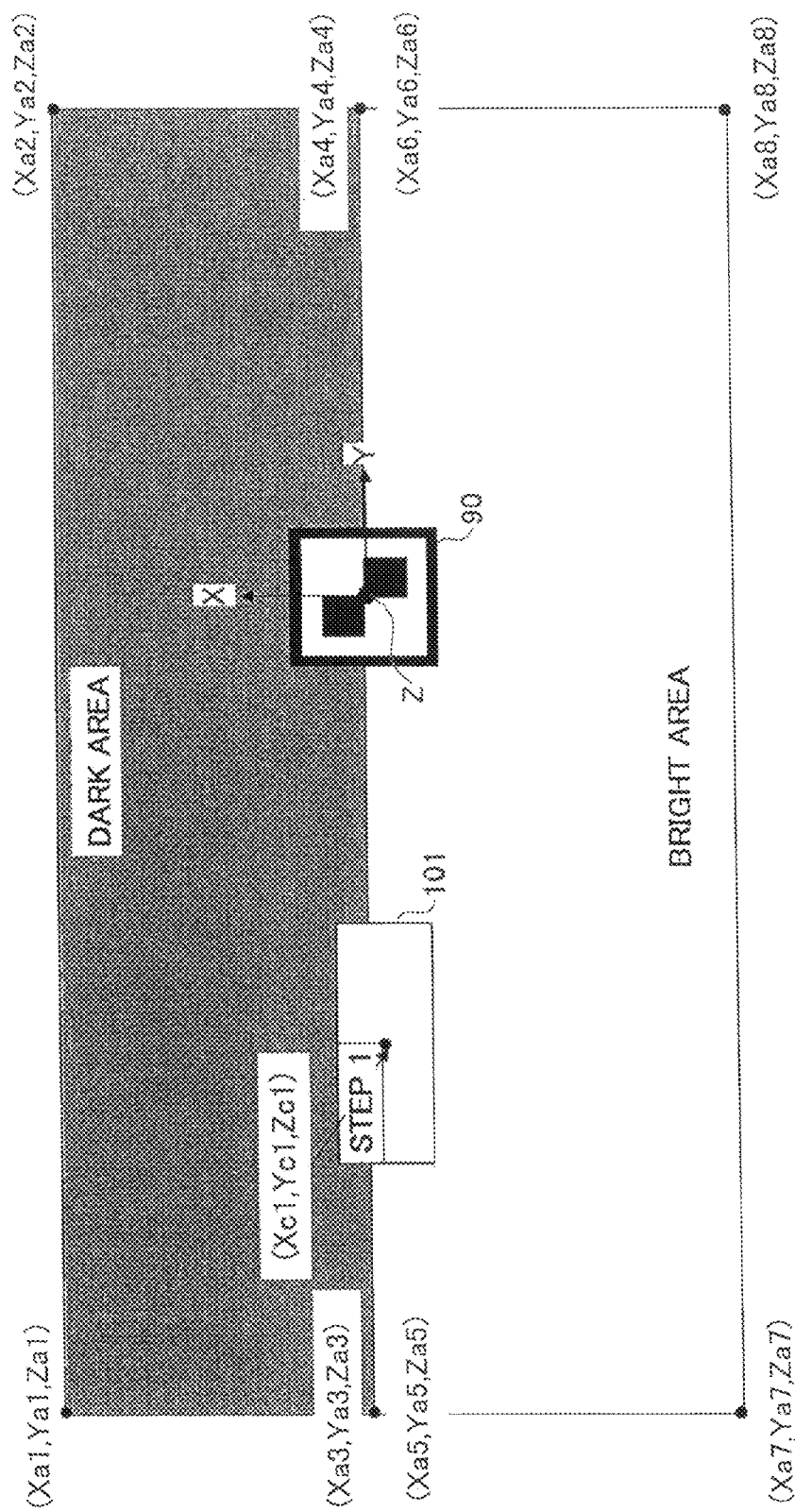

FIG.9A

| MARKER ID | 1 |
|---|---|
| AFFIRMATIVE AR CONTENT ID | 1,2 |
| NEGATIVE AR CONTENT ID | 3 |
| BRIGHT/DARK AREA ID | 1,2 |

FIG.9B

| AR CONTENT ID | COORDINATES | ROTATION ANGLE | MAGNIFICATION/ REDUCTION RATIO | TEXTURE PATH |
|---|---|---|---|---|
| 1 | (Xc1,Yc1,Zc1) | (Xr1,Yr1,Zr1) | (Xs1,Ys1,Zs1) | http://xxx.png |
| 2 | (Xc2,Yc2,Zc2) | (Xr2,Yr2,Zr2) | (Xs2,Ys2,Zs2) | http://yyy.png |
| 3 | (Xc3,Yc3,Zc3) | (Xr3,Yr3,Zr3) | (Xs3,Ys3,Zs3) | http://zzz.png |

FIG.9C

| BRIGHT/DARK AREA ID | COORDINATES | BRIGHT/DARK VALUE |
|---|---|---|
| 1 | (Xa1,Ya1,Za1),(Xa2,Ya2,Za2),(Xa3,Ya3,Za3),(Xa4,Ya4,Za4) | 1 (BRIGHT) |
| 2 | (Xa5,Ya5,Za5),(Xa6,Ya6,Za6),(Xa7,Ya7,Za7),(Xa8,Ya8,Za8) | 0 (DARK) |

FIG.10A

| MARKER ID | AFFIRMATIVE AR CONTENT ID | NEGATIVE AR CONTENT ID | BRIGHT/DARK AREA ID |
|---|---|---|---|
| 1 | 1,2 | 3 | 1,2 |
| 1/2 | 2,3 | 4,5 | 3,4,5 |
| 2 | 1,2 | 5,6,7 | 6,7 |
| ... | | | |

FIG.10B

| AR CONTENT ID | COORDINATES | ROTATION ANGLE | MAGNIFICATION/REDUCTION RATIO | TEXTURE PATH |
|---|---|---|---|---|
| 1 | (Xc1,Yc1,Zc1) | (Xr1,Yr1,Zr1) | (Xs1,Ys1,Zs1) | http://xxx.png |
| 2 | (Xc2,Yc2,Zc2) | (Xr2,Yr2,Zr2) | (Xs2,Ys2,Zs2) | http://yyy.png |
| 3 | (Xc3,Yc3,Zc3) | (Xr3,Yr3,Zr3) | (Xs3,Ys3,Zs3) | http://zzz.png |
| ... | | | | |

FIG.10C

| BRIGHT/DARK AREA ID | COORDINATES | BRIGHT/DARK VALUE |
|---|---|---|
| 1 | (Xa1,Ya1,Za1),(Xa2,Ya2,Za2),(Xa3,Ya3,Za3),(Xa4,Ya4,Za4) | 1 (BRIGHT) |
| 2 | (Xa5,Ya5,Za5),(Xa6,Ya6,Za6),(Xa7,Ya7,Za7),(Xa8,Ya8,Za8) | 0 (DARK) |
| 3 | (Xa9,Ya9,Za9),(Xa10,Ya10,Za10),(Xa11,Ya11,Za11),(Xa12,Ya12,Za12) | 1 (BRIGHT) |
| ... | | ... |

FIG.17A

| MARKER ID | 1 |
|---|---|
| TIME PERIOD 1 | 8:00~18:00 |
| TIME PERIOD 2 | 18:00~8:00 |

FIG.17B

| AR CONTENT ID | COORDINATES | ROTATION ANGLE | MAGNIFICATION/REDUCTION RATIO | TEXTURE PATH |
|---|---|---|---|---|
| 1 | (Xc1,Yc1,Zc1) | (Xr1,Yr1,Zr1) | (Xs1,Ys1,Zs1) | http://xxx.png |
| 2 | (Xc2,Yc2,Zc2) | (Xr2,Yr2,Zr2) | (Xs2,Ys2,Zs2) | http://yyy.png |
| 3 | (Xc3,Yc3,Zc3) | (Xr3,Yr3,Zr3) | (Xs3,Ys3,Zs3) | http://zzz.png |
| 4 | (Xc4,Yc4,Zc4) | (Xr4,Yr4,Zr4) | (Xs4,Ys4,Zs4) | http://aaa.png |
| 5 | (Xc5,Yc5,Zc5) | (Xr5,Yr5,Zr5) | (Xs5,Ys5,Zs5) | http://bbb.png |

FIG.17C

| TIME PERIOD ID | AFFIRMATIVE AR CONTENT ID | NEGATIVE AR CONTENT ID | BRIGHT/DARK AREA ID |
|---|---|---|---|
| 1 | 1,2 | 4 | 1,2 |
| 2 | 3 | 5 | 3,4 |

FIG.17D

| BRIGHT/DARK AREA ID | COORDINATES | BRIGHT/DARK VALUE |
|---|---|---|
| 1 | (Xa1,Ya1,Za1),(Xa2,Ya2,Za2),(Xa3,Ya3,Za3),(Xa4,Ya4,Za4) | 1 (BRIGHT) |
| 2 | (Xa5,Ya5,Za5),(Xa6,Ya6,Za6),(Xa7,Ya7,Za7),(Xa8,Ya8,Za8) | 0 (DARK) |
| 3 | (Xa9,Ya9,Za9),(Xa10,Ya10,Za10),(Xa11,Ya11,Za11),(Xa12,Ya12,Za12) | 1 (BRIGHT) |
| 4 | (Xa13,Ya13,Za13),(Xa14,Ya14,Za14),(Xa15,Ya15,Za15),(Xa16,Ya16,Za16) | 1 (BRIGHT) |

FIG.18A

| MARKER ID | TIME PERIOD ID |
|---|---|
| 1 | 1,2 |
| 1/2 | 3,4 |
| 2 | 5,6 |
| ... | ... |

FIG.18B

| TIME PERIOD ID | TIME PERIOD | AFFIRMATIVE AR CONTENT ID | NEGATIVE AR CONTENT ID | BRIGHT/DARK AREA ID |
|---|---|---|---|---|
| 1 | 8:00~18:00 | 1,2 | 3 | 1,2 |
| 2 | 18:00~8:00 | 2,3 | 4,5 | 3,4,5 |
| 3 | 0:00~12:00 | 1,2 | 5,6,7 | 6,7 |
| ... | ... | ... | ... | ... |

FIG.18C

| AR CONTENT ID | COORDINATES | ROTATION ANGLE | MAGNIFICATION/REDUCTION RATIO | TEXTURE PATH |
|---|---|---|---|---|
| 1 | (Xc1,Yc1,Zc1) | (Xr1,Yr1,Zr1) | (Xs1,Ys1,Zs1) | http://xxx.png |
| 2 | (Xc2,Yc2,Zc2) | (Xr2,Yr2,Zr2) | (Xs2,Ys2,Zs2) | http://yyy.png |
| 3 | (Xc3,Yc3,Zc3) | (Xr3,Yr3,Zr3) | (Xs3,Ys3,Zs3) | http://zzz.png |
| ... | ... | ... | ... | ... |

FIG.18D

| BRIGHT/DARK AREA ID | COORDINATES | BRIGHT/DARK VALUE |
|---|---|---|
| 1 | (Xa1,Ya1,Za1),(Xa2,Ya2,Za2),(Xa3,Ya3,Za3),(Xa4,Ya4,Za4) | 1 (BRIGHT) |
| 2 | (Xa5,Ya5,Za5),(Xa6,Ya6,Za6),(Xa7,Ya7,Za7),(Xa8,Ya8,Za8) | 0 (DARK) |
| 3 | (Xa9,Ya9,Za9),(Xa10,Ya10,Za10),(Xa11,Ya11,Za11),(Xa12,Ya12,Za12) | 1 (BRIGHT) |
| ... | ... | ... |

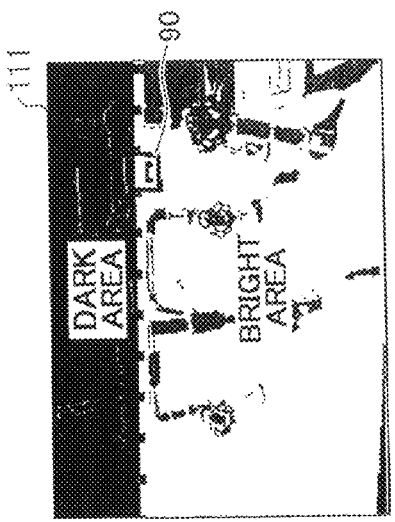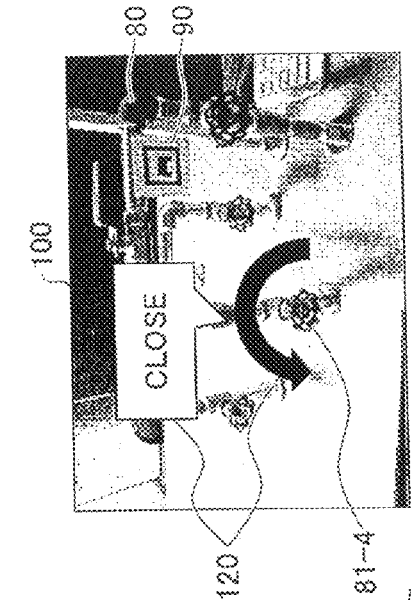
FIG.19A
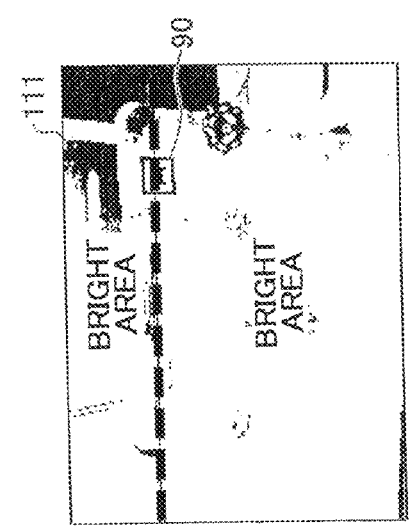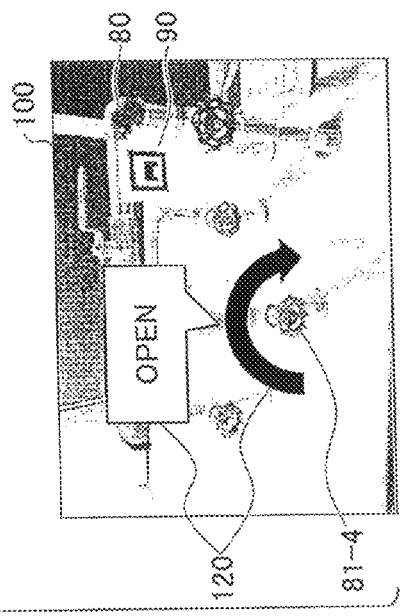
FIG.19B

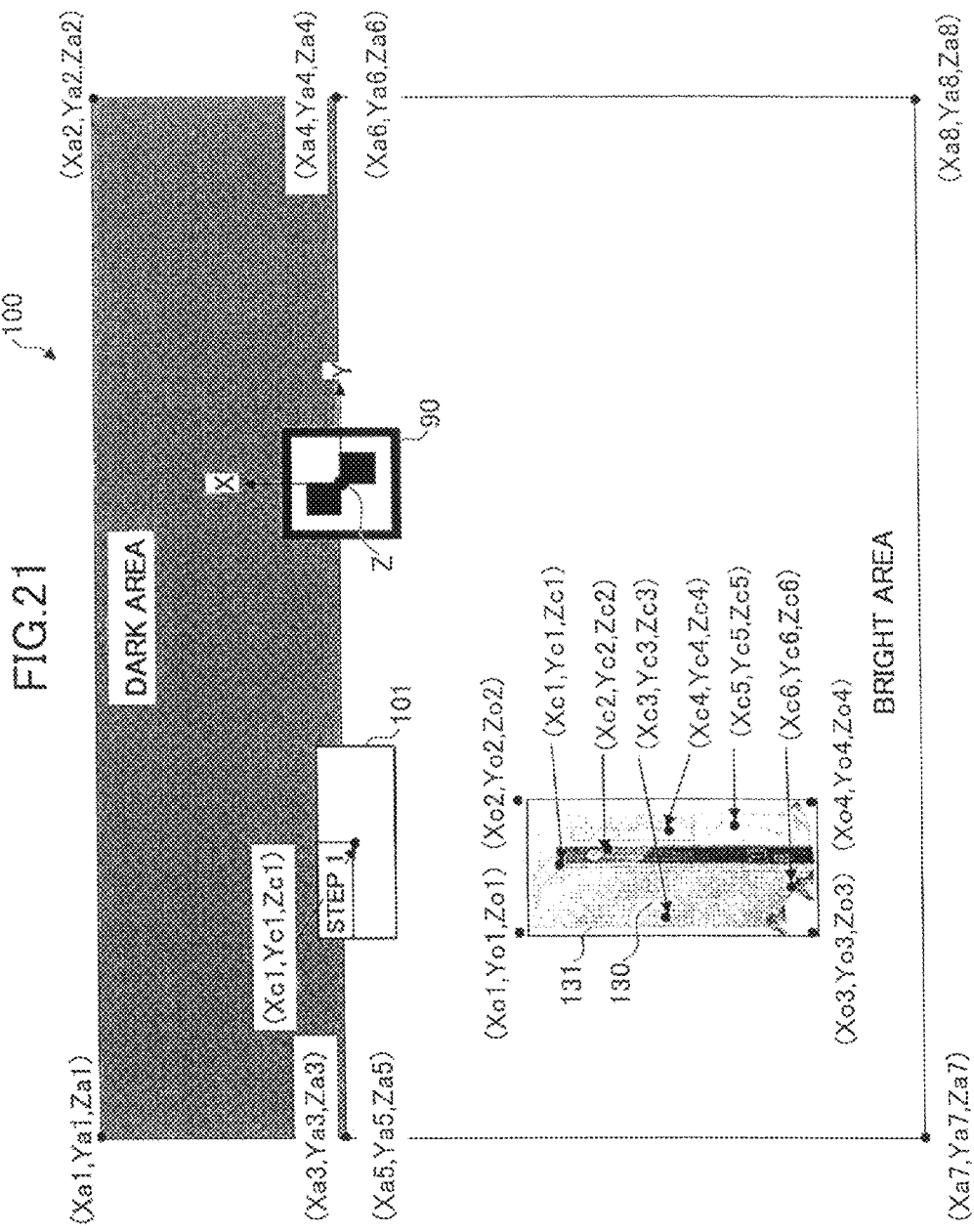

FIG.22A

| MARKER ID | 1 |
|---|---|
| AFFIRMATIVE AR CONTENT ID | 1,2 |
| NEGATIVE AR CONTENT ID | 3 |
| BRIGHT/DARK AREA ID | 1,2 |
| OBJECT ID | 1,2 |

FIG.22B

| AR CONTENT ID | COORDINATES | ROTATION ANGLE | MAGNIFICATION/REDUCTION RATIO | TEXTURE PATH |
|---|---|---|---|---|
| 1 | (Xc1,Yc1,Zc1) | (Xr1,Yr1,Zr1) | (Xs1,Ys1,Zs1) | http://xxx.png |
| 2 | (Xc2,Yc2,Zc2) | (Xr2,Yr2,Zr2) | (Xs2,Ys2,Zs2) | http://yyy.png |
| 3 | (Xc3,Yc3,Zc3) | (Xr3,Yr3,Zr3) | (Xs3,Ys3,Zs3) | http://zzz.png |
| 4 | (Xc4,Yc4,Zc4) | (Xr4,Yr4,Zr4) | (Xs4,Ys4,Zs4) | http://aaa.png |
| 5 | (Xc5,Yc5,Zc5) | (Xr5,Yr5,Zr5) | (Xs5,Ys5,Zs5) | http://bbb.png |

FIG.22C

| BRIGHT/DARK AREA ID | COORDINATES | BRIGHT/DARK VALUE |
|---|---|---|
| 1 | (Xa1,Ya1,Za1),(Xa2,Ya2,Za2),(Xa3,Ya3,Za3),(Xa4,Ya4,Za4) | 1 (BRIGHT) |
| 2 | (Xa5,Ya5,Za5),(Xa6,Ya6,Za6),(Xa7,Ya7,Za7),(Xa8,Ya8,Za8) | 0 (DARK) |

FIG.22D

| OBJECT ID | OBJECT COORDINATES | AFFIRMATIVE AR CONTENT ID | FEATURE POINT COORDINATES |
|---|---|---|---|
| 1 | (Xo1,Yo1,Zo1),(Xo2,Yo2,Zo2),(Xo3,Yo3,Zo3),(Xo4,Yo4,Zo4) | 4 | (Xc1,Yc1,Zc1),(Xc2,Yc2,Zc2),(Xc3,Yc3,Zc3),(Xc4,Yc4,Zc4),(Xc5,Yc5,Zc5),(Xc6,Yc6,Zc6) |
| 2 | (Xo5,Yo5,Zo5),(Xo6,Yo6,Zo6),(Xo7,Yo7,Zo7),(Xo8,Yo8,Zo8) | 5 | (Xc7,Yc7,Zc7),(Xc8,Yc8,Zc8),(Xc9,Yc9,Zc9),(Xc10,Yc10,Zc10),(Xc11,Yc11,Zc11),(Xc12,Yc12,Zc12),(Xc13,Yc13,Zc13) |

FIG. 23A

| MARKER ID | AFFIRMATIVE AR CONTENT ID | NEGATIVE AR CONTENT ID | BRIGHT/DARK AREA ID | OBJECT ID |
|---|---|---|---|---|
| 1 | 1,2 | 3 | 1,2 | 1,2 |
| 2 | 2,3 | 4,5 | 3,4,5 | 3,4 |
| 3 | 1,2 | 5,6,7 | 6,7 | 5,6 |
| ... | | | | |

FIG. 23B

| AR CONTENT ID | COORDINATES | ROTATION ANGLE | MAGNIFICATION/REDUCTION RATIO | TEXTURE PATH |
|---|---|---|---|---|
| 1 | (Xc1,Yc1,Zc1) | (Xr1,Yr1,Zr1) | (Xs1,Ys1,Zs1) | http://xxx.png |
| 2 | (Xc2,Yc2,Zc2) | (Xr2,Yr2,Zr2) | (Xs2,Ys2,Zs2) | http://yyy.png |
| 3 | (Xc3,Yc3,Zc3) | (Xr3,Yr3,Zr3) | (Xs3,Ys3,Zs3) | http://zzz.png |
| ... | | | | |

FIG. 23C

| BRIGHT/DARK AREA ID | COORDINATES | BRIGHT/DARK VALUE |
|---|---|---|
| 1 | (Xa1,Ya1,Za1),(Xa2,Ya2,Za2),(Xa3,Ya3,Za3),(Xa4,Ya4,Za4) | 1 (BRIGHT) |
| 2 | (Xa5,Ya5,Za5),(Xa6,Ya6,Za6),(Xa7,Ya7,Za7),(Xa8,Ya8,Za8) | 0 (DARK) |
| 3 | (Xa9,Ya9,Za9),(Xa10,Ya10,Za10),(Xa11,Ya11,Za11),(Xa12,Ya12,Za12) | 1 (BRIGHT) |
| ... | | |

FIG. 23D

| OBJECT ID | OBJECT COORDINATES | AFFIRMATIVE AR CONTENT ID | FEATURE POINT COORDINATES |
|---|---|---|---|
| 1 | (Xo1,Yo1,Zo1),(Xo2,Yo2,Zo2),(Xo3,Yo3,Zo3),(Xo4,Yo4,Zo4) | 4 | (Xc1,Yc1,Zc1),(Xc2,Yc2,Zc2),(Xc3,Yc3,Zc3),(Xc4,Yc4,Zc4),(Xc5,Yc5,Zc5),(Xc6,Yc6,Zc6) |
| 2 | (Xo5,Yo5,Zo5),(Xo6,Yo6,Zo6),(Xo7,Yo7,Zo7),(Xo8,Yo8,Zo8) | 5 | (Xc7,Yc7,Zc7),(Xc8,Yc8,Zc8),(Xc9,Yc9,Zc9),(Xc10,Yc10,Zc10),(Xc11,Yc11,Zc11),(Xc12,Yc12,Zc12),(Xc13,Yc13,Zc13) |
| ... | | | |

TERMINAL, INFORMATION PROCESSING APPARATUS, DISPLAY CONTROL METHOD, AND STORAGE MEDIUM

CROSS-REFERENCE TO RELATED APPLICATION

This application is based upon and claims the benefit of priority of Japanese Patent Application No. 2014-021589 filed on Feb. 6, 2014, the entire contents of which are incorporated herein by reference.

FIELD

An aspect of this disclosure relates to a terminal, an information processing apparatus, a display control method, and a storage medium.

BACKGROUND

Augmented reality (AR) is a technology to superimpose content information on a part of a captured image captured by an imaging unit of a terminal. A display position in a virtual space corresponding to a real space is set for each content (which is hereafter referred to as an "AR content") provided using the AR technology. Also, an AR marker is used as a criterion (or a reference object) for determining the positional relationship between a terminal and an AR content. That is, the positional relationship between the terminal and the AR content is determined based on an image of the AR marker in a captured image captured by the terminal.

An AR content such as a superimposed image to be displayed based on an AR marker recognized by a terminal may be registered beforehand by an administrator, and may also be registered by an operator. Through a registration operation, a user such as an administrator or an operator can set an AR content at a position relative to an AR marker (see, for example, Japanese Laid-Open Patent Publication No. 2010-531089 and WO 2005/119539).

SUMMARY

According to an aspect of this disclosure, there is provided a terminal including a processor configured to execute a process that includes determining whether a reference object is included in an input image, determining whether first characteristic information of the input image includes second characteristic information that is associated with identification information of the reference object, and generating an image in which a content associated with the identification information of the reference object is superimposed on the input image based on a result of the determining that the first characteristic information includes the second characteristic information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a drawing illustrating an exemplary configuration of an information processing system;

FIG. 2 is a block diagram illustrating an exemplary functional configuration of a server;

FIG. 8 is a drawing illustrating an exemplary setting of bright and dark areas;

FIGS. 9A through 9C are tables illustrating exemplary data stored in a terminal according to the first embodiment;

FIGS. 10A through 10C are tables illustrating exemplary data stored in a server according to the first embodiment;

FIGS. 17A through 17D are tables illustrating exemplary data stored in a terminal when time information is used;

FIGS. 18A through 18D are tables illustrating exemplary data stored in a server when time information is used;

FIGS. 19A and 19B are drawings illustrating examples of AR contents displayed according to the results of determination processes performed using time information;

FIG. 21 is a drawing illustrating an exemplary setting of characteristic information of an object;

FIGS. 22A through 22D are tables illustrating exemplary data stored in a terminal according to the second embodiment;

FIGS. 23A through 23D are tables illustrating exemplary data stored in a server according to the second embodiment;

DESCRIPTION OF EMBODIMENTS

Figure 3:
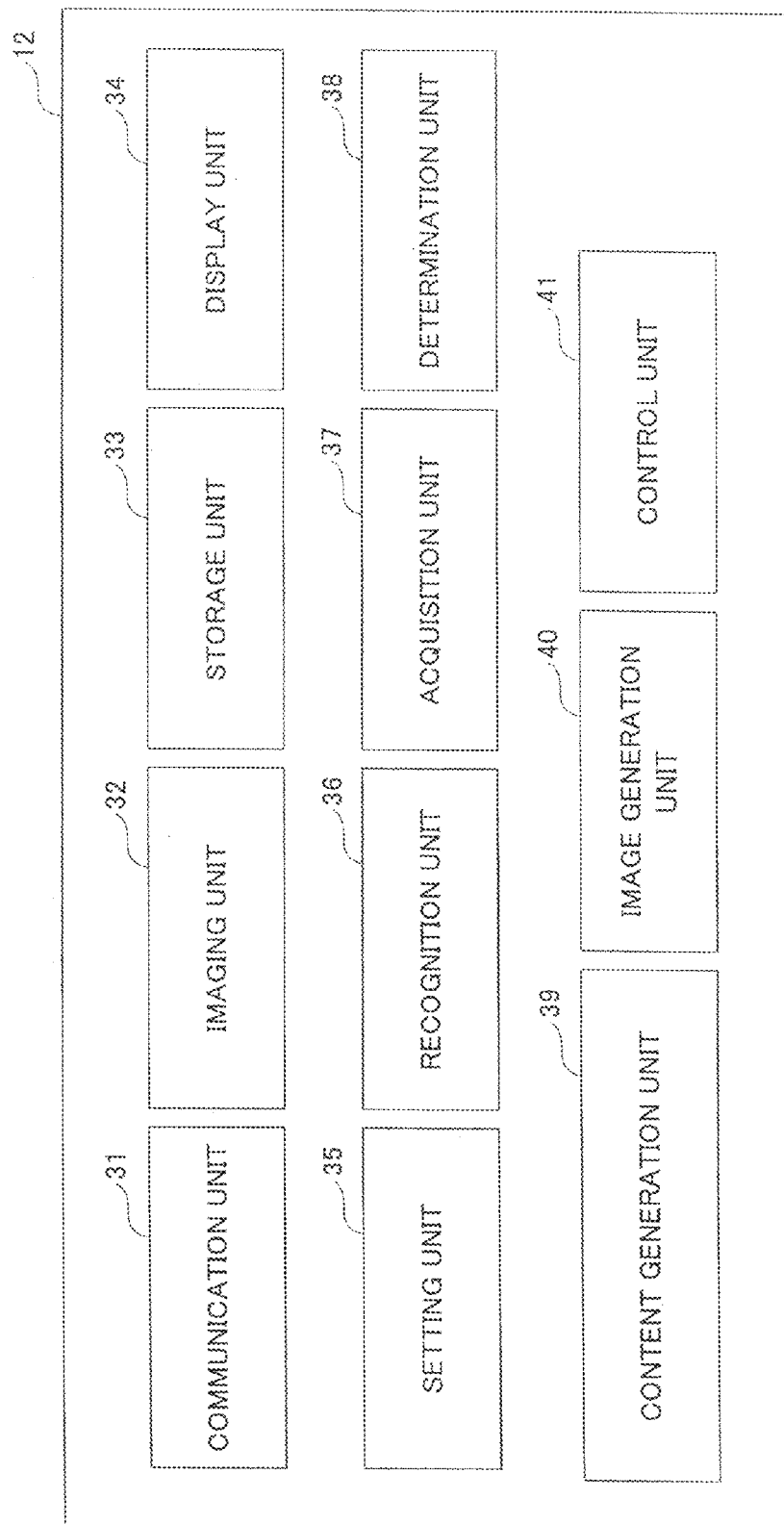
FIG. 3 is a block diagram illustrating an exemplary functional configuration of a terminal.

As described above, with the related art, an AR content is displayed based only on recognition of an AR marker. Therefore, as long as an AR marker is recognized, an AR content is displayed regardless of the situation where the AR marker is recognized. That is, an AR content associated with an AR marker is displayed even when the AR marker is a duplicate or has been moved to an improper position. Also with the related art, in a case where an AR content is registered in response to recognition of an AR marker, it is not possible to determine whether the AR marker has been recognized at a position (e.g., in the field) where the AR marker is originally intended to be placed.

An aspect of this disclosure provides a terminal, an information processing apparatus, a display control method, and a storage medium that can properly control display of AR contents.

Preferred embodiments are described below with reference to the accompanying drawings.

<Configuration of Information Processing System>

FIG. 1 is a drawing illustrating an exemplary configuration of an information processing system 10. As illustrated by FIG. 1, the information processing system 10 may include a server 11 as an example of an information processing apparatus, and one or more terminals 12-1 through 12-n (which may be collectively referred to as a "terminal 12" or "terminals 12"). The server 11 and the terminals 12 are connected to each other via, for example, a communication network 13 so as to be able to send and receive data.

The server 11 manages, for example, AR markers that are examples of reference objects, one or more AR contents registered in association with each of the AR markers, and decision criteria (e.g., characteristic information of an image) for display control of the terminal 12. An AR marker specifies, for example, content information such as an AR content and a position where the content information is to be displayed. An AR marker is, for example, but not limited to, an image that is formed in a predetermined area and represents a graphical or character pattern such as a two-dimensional code.

An AR content is information to be superimposed on an image captured, for example, by the terminal 12. For example, an AR content may be model data of a three-dimensional object disposed in a three-dimensional virtual space corresponding to a real space. An AR content is displayed at a position specified by relative coordinates in a relative coordinate system (marker coordinate system) relative to an AR marker included in, for example, a captured image. According to the present embodiment, AR contents are associated with AR markers. Examples of AR contents include text, icons, animations, marks, patterns, images, and videos. AR contents are not limited to information to be displayed, but may also be other types of information such as audio.

Characteristic information of an image indicates characteristics or features of the image that includes an AR marker(s) and is captured in advance. Examples of characteristic information include, but are not limited to, bright and dark areas in an image (e.g., bright and dark areas surrounding (or in the background of) an AR marker) and feature points of an object in an image.

When receiving information (e.g., a marker ID) regarding an AR marker from the terminal 12, the server 11 sends an AR content(s) corresponding the marker ID, and a decision criterion (or decision criteria) used to determine whether an image including the AR marker has been captured at a correct position (field). The "correct position" is a position set by a registrant when, for example, registering an AR content in association with an AR marker.

The present embodiment may be modified in any appropriate manner. For example, the server 11 may be configured to receive a marker ID, positional information, and a captured image from the terminal 12, and to determine whether the image has been captured at a correct position based on a predetermined decision criterion. Also, the server 11 may be configured to retrieve an AR content associated with the marker ID based on the determination result, and send the retrieved AR content to the terminal 12.

The server 11 may be implemented by a personal computer (PC). However, the server 11 is not limited to a PC. For example, the server 11 may be a cloud server implemented by one or more information processing apparatuses in a cloud computing system.

The terminal 12, for example, registers AR contents in association with AR markers, determines whether an AR marker has been captured at a correct position based on the captured AR marker and a predetermined decision criterion, and displays an AR content depending on the determination result.

For example, the terminal 12 recognizes an AR marker(s) included in an image captured by an imaging unit such as a built-in camera of the terminal 12 (marker recognition). Also, the terminal 12 determines whether the image including the AR marker recognized by the marker recognition includes characteristic information (decision criterion) of an image captured in advance and including the same AR marker. Also, based on the determination result, the terminal 12 controls output of superimposed information such as an AR content associated with the AR marker (e.g., controls whether to output superimposed information or selects superimposed information to be output). Also, the terminal 12 may be configured to send information on the AR marker recognized by the marker recognition and positional information to the server 11, and to perform display control based on the result of determination performed at the server 11. In the present embodiment, different AR contents may be displayed depending on whether an image has been captured at a correct position (field) (determination result: affirmative) or at an incorrect position (determination result: negative).

In the marker recognition of the present embodiment, when the determination is made based only on a characteristic (e.g., bright and dark areas) of an image including an AR marker captured from one angle, an image including the AR marker captured at a different position may coincidentally have the same characteristic. In such a case, it is determined that the AR marker has been captured at a correct position and an AR content associated with the AR marker is displayed even when the AR marker has actually been captured at an incorrect position.

To prevent this problem, whether an AR marker has been captured at a correction position may be determined using the AR marker and characteristics of images captured by the terminal 12 from multiple (e.g., three) angles. For example, the terminal 12 may be configured to determine the number of angles from which an AR marker is captured based on the particularities of characteristic information of an image (e.g., the positions of and/or the ratio between bright and dark areas in the image).

Examples of the terminal 12 include, but are not limited to, a tablet terminal, a smartphone, a personal digital assistant (PDA), a notebook PC, a game machine, and a communication terminal such as a cell phone.

The communication network 13 is, for example, but not limited to, the Internet or a local area network (LAN). Also, the communication network 13 may be a wired network, a wireless network, or a combination of them.

In the information processing system 10 of FIG. 1, one server 11 is provided for multiple terminals 12. However, the present invention is not limited to this configuration. For example, the information processing system 10 may include multiple severs 11.

<Functional Configuration of Server>

An exemplary functional configuration of the server 11 is described below. FIG. 2 is a block diagram illustrating an exemplary functional configuration of the server 11. The server 11 may include a communication unit 21, a storage unit 22, a registration unit 23, a retrieval unit 24, and a control unit 25.

The communication unit 21 sends and receives data via the communication network 13 to and from the terminal 12 and other computers. For example, the communication unit 21 receives, from the terminal 12, a registration request to register an AR marker, and an AR content and a decision criterion such as characteristic information of an image to be registered in association with the AR marker. Also, the communication unit 21 receives identification information (e.g., a marker ID) of the registered AR marker, and sends a decision criterion and an AR content corresponding to the identification information to the terminal 12.

The storage unit 22 stores various types of information (e.g., a marker ID management table, an AR content management table, a bright/dark area management table, a time-period-dependent data management table, and an object management table) used for a display control process of the present embodiment. For example, the storage unit 22 stores setting information generated at the terminal 12 when generating AR contents, one or more AR contents, and decision criteria such as characteristic information of images set for respective AR markers, time information, and object characteristic information.

The registration unit 23 registers various types of registration information such as AR contents obtained from the terminal 12. For example, the registration unit 23 registers identification information (marker IDs) of AR markers, decision criteria set for the marker IDs, and AR content information in association with each other. The registered information is stored in the storage unit 22.

The retrieval unit 24 refers to the storage unit 22 based on identification information (marker ID) obtained from the terminal 12 to retrieve a decision criterion and AR content information corresponding to the marker ID. The decision criterion and the AR content information retrieved by the retrieval unit 24 are sent by the communication unit 21 to the terminal 12 that has sent the marker ID.

When positional information is obtained from the terminal 12 in addition to the marker ID, the retrieval unit 24 may determine whether the AR marker has been captured at a correct position based on the decision criterion associated with the marker ID. For example, the retrieval unit 24 determines whether the characteristic information of an input image in which a reference object (e.g., an AR marker) is recognized by the terminal 12 includes characteristic information associated with the identification information (e.g., a marker ID) of the recognized AR marker. Also, the retrieval unit 24 may be configured to send the AR content information associated with the marker ID to the terminal 12 when it is determined that the input image or the AR marker has been captured at a correct position.

The control unit 25 controls other components of the server 11. For example, the control unit 25 controls transmission and reception of information by the communication unit 21, storage of data by the storage unit 22, registration of AR contents and decision criteria by the registration unit 23, and retrieval of AR contents and decision criteria by the retrieval unit 24. Control processes performed by the control unit 25 are not limited to those described above.

<Functional Configuration of Terminal>

An exemplary functional configuration of the terminal 12 is described below. FIG. 3 is a block diagram illustrating an exemplary functional configuration of the terminal 12. The terminal 12 may include a communication unit 31, an imaging unit 32, a storage unit 33, a display unit 34, a setting unit 35, a recognition unit 36, an acquisition unit 37, a determination unit 38, a content generation unit 39, an image generation unit 40, and a control unit 41.

The communication unit 31 sends and receives data via the communication network 13 to and from the terminal 11 and other computers. For example, the communication unit 31 sends AR content information associated with an AR marker, and setting information such as a decision criterion represented, for example, by characteristic information of an image. Also, the communication unit 31 sends a marker ID recognized by marker recognition to the server 11, and receives a decision criterion and an AR content corresponding to the sent marker ID from the server 11.

The imaging unit 32 captures images at a predetermined frame interval. The imaging unit 32, for example, outputs the captured images to the control unit 41 or stores the captured images in the storage unit 33.

The storage unit 33 stores various types of information (e.g., a data management table, an AR content management table, a bright/dark area management table, a time-period-dependent data management table, and an object management table) used for a display control process of the present embodiment. For example, the storage unit 33 stores AR markers and decision criteria that are set when AR contents are registered, and AR contents to be displayed depending on determination results. Examples of decision criteria include, but are not limited to, characteristic information of images (e.g., bright and dark areas and/or information on characteristic points in the images), time information, and object information. The storage unit 33 may also temporarily store, for example, a determination status (indicating the progress of a determination process). The storage unit 33 stores not only information set by the terminal, but also information obtained from the server 11. Information set by the terminal 12 may be deleted from the storage unit 33 after the information is sent to the server 11.

The display unit 34, based on determination results of the determination unit 38, displays a screen for registering an AR content for a captured image generated by the image generation unit 40, a superimposed image where the registered AR content is superimposed on the captured image, and various setting screens. When the display unit 34 includes a touch panel, the display unit 34 can also obtain coordinates of a touched position on the touch panel. Also, the display unit 34 may also display, under the control of the control unit 41, a navigation frame indicating a position at which a user captures an AR marker in a marker recognition process.

The setting unit 35 sets AR contents to be displayed depending on determination results when an AR marker is recognized, and positions at which the AR contents are displayed. The setting unit 35 sends set information to the server 11 and thereby requests registration of the set information.

Also, the setting unit 35 sets decision criteria that include, but are not limited to, characteristic information (e.g., bright/dark area information (brightness/darkness information)) of images, time information, and object information.

Also, when a captured image includes multiple AR markers, the setting unit 35 may set combinations of the AR makers. Each combination defines AR markers for which common characteristic information is set when the AR markers are captured at the same time.

The recognition unit 36 recognizes a reference object(s) (e.g., an AR marker) included in an input image. For example, the recognition unit 36 performs image recognition on a captured image captured by the imaging unit 32, and obtains an AR marker and information on an object (physical object) in a real space from the results of the image recognition. Also, the recognition unit 36 obtains a position (coordinates) of the AR marker relative to the imaging unit 32, and identification information (marker ID) of the AR marker. In the present embodiment, there is a case where the same identification information is obtained from different reference objects (AR markers).

In the present embodiment, an AR marker is attached to an object (physical object) in a real space, and an AR content, such as instructions, steps, and notes for using the object, associated with the identification information of the AR marker is superimposed on a captured image including the object.

A reference object in the present embodiment is not limited to an AR marker. For example, any pre-registered object may be used as a reference object. In this case, the recognition unit 36 recognizes the registered object in an input image, and obtains identification information corresponding to the recognized object.

The acquisition unit 37 obtains characteristic information of an image area defined by coordinates relative to an AR marker (reference object) recognized by the recognition unit 36. The characteristic information is set by the setting unit 35 and is used as decision criteria. Examples of characteristic information include, but are not limited to, bright/dark area information (brightness/darkness information or first characteristic information) and feature point information (second characteristic information) of an image. The characteristic information may be prepared beforehand in predetermined data formats.

The acquisition unit 37 may recognize an AR marker, an object (physical object) for which an AR content corresponding to the AR marker is set, and an object used in a determination process by the determination unit 38 using an object recognition technique such as feature extraction or luminance difference extraction. For example, the acquisition unit 37 may be configured to obtain the highest and lowest luminance values in a predetermined area of a captured image, and to recognize an object from a feature quantity in the area based on the difference (luminance difference) between the highest and lowest luminance values. Also, the acquisition unit 37 may also obtain a marker ID of the recognized AR marker, and positional and rotational (angle) information of the AR marker. Also, the acquisition unit 37 may be configured to store, in advance, templates defining the shapes of AR markers and objects in the storage unit 33, and to recognize AR markers and objects by template matching. The acquisition unit 37 may perform an acquisition process immediately after a recognition process is performed by the recognition unit 36, or at any other timing. Further, the acquisition unit 37 may be configured to obtain characteristic information from an image captured by another terminal.

The determination unit 38 determines whether the characteristic information, which is obtained by the acquisition unit 37, of an input image including a reference object (e.g., an AR marker) recognized by the recognition unit 36 includes a decision criterion (e.g., characteristic information such as bright/dark area information or feature point information of an image) associated with the identification information of the reference object. As a non-limiting example, the determination unit 38 may determine the degree to which the characteristic information of an input image, in which an AR marker has been recognized, matches characteristic information associated with the identification information of the AR marker, and thereby determine whether the AR marker or the image has been captured at a correct position. The determination unit 38 may also take into account time information in determining whether an AR marker or an image has been captured at a correct position. In the present embodiment, determining whether an AR marker or an image has been captured at a correct position is to determine whether to display an AR content associated with the AR marker on a screen.

Also, the determination unit 38 may be configured to determine whether an AR marker has been captured at a correct position based on characteristic information of multiple images including the AR marker captured from different directions. Also, the determination unit 38 may be configured to determine whether an AR marker has been captured at a correct position based on characteristic information of an image associated with time information (e.g., a time period).

The content generation unit 39 generates an AR content that is displayed for an AR marker based on the result of determination by the determination unit 38. An AR content is displayed, for example, at a predetermined position relative to a predetermined blank area in an image. As a non-limiting example, a point specified on a screen by a user via the content generation unit 39 may be converted into coordinates in a coordinate system (marker coordinate system) having its origin at the position of an AR marker, and the coordinates may be used as relative-position information relative to the AR marker.

The image generation unit 40 generates a superimposed image (composite image) by superimposing, on a captured image, an AR content corresponding to a result of a determination process performed based on, for example, an AR marker and characteristic information of the captured image. The image generation unit 40 may be configured to superimpose different AR contents on a captured image depending on determination results (affirmative and negative) of the determination unit 38. Also, the image generation unit 40 may be configured to superimpose different AR contents on a captured image depending on obtained time information. As a non-limiting example, the image generation unit 40 displays an AR content on a screen at a position relative to an AR marker.

The control unit 41 controls other components of the terminal 12 and processes performed by those components. For example, the control unit 41 causes the imaging unit 32 to capture an image, causes the display unit 34 to display various types of information on a screen of the terminal 12, and causes the setting unit 35 to make various settings related to display control according to the present embodiment.

The control unit 41 also causes the recognition unit 36 to recognize AR markers and object information in a captured image, causes the acquisition unit 37 to obtain characteristic information included in an image, causes the determination unit 38 to perform a determination process based on characteristic information of a captured image and a decision criterion, causes the content generation unit 39 to generate AR contents, and causes the image generation unit 40 to generate a superimposed image.

<Hardware Configuration of Server>

Figure 4:
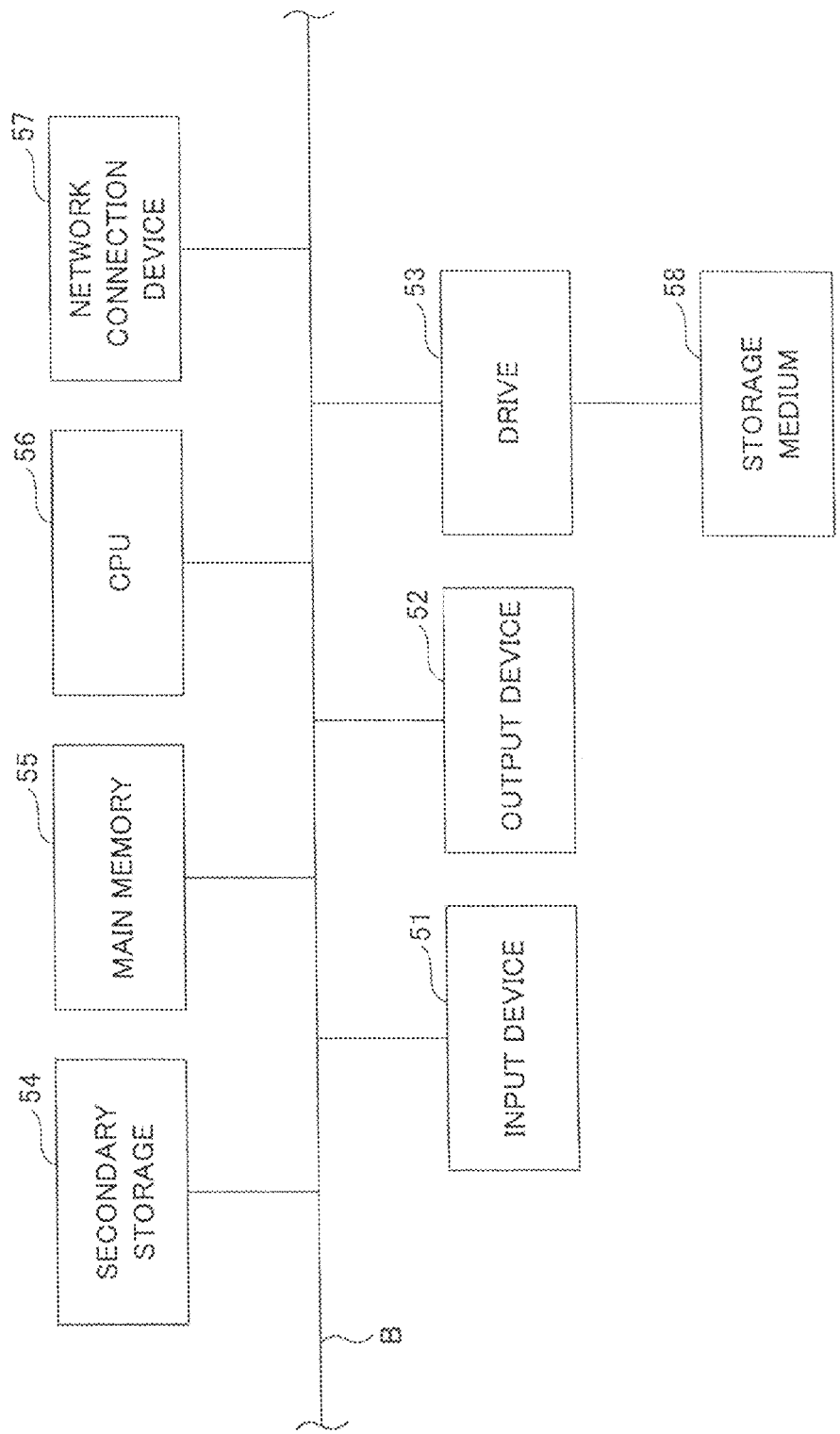
FIG. 4 is a block diagram illustrating an exemplary hardware configuration of a server.

An exemplary hardware configuration of the server 11 is described below. FIG. 4 is a block diagram illustrating an exemplary hardware configuration of the server 11. As illustrated by FIG. 4, the server 11 may include an input device 51, an output device 52, a drive 53, a secondary storage 54, a main memory 55, a central processing unit (CPU) 56, and a network connection device 57 that are connected to each other via a system bus B.

The input device 51 may include a keyboard and a mouse operated by a user and an audio input device such as a microphone, and may receive, for example, user inputs such as an instruction to execute a program, operational information, and information for activating software.

The output unit 52 may include a display that displays various windows and data necessary to operate a computer (the server 11) that performs various processes according to the present embodiment. According to a control program of the CPU 56, the output device 52 can display progress and results of executed programs.

In the present embodiment, execution programs to be installed into the computer may be provided via a storage medium 58. The storage medium 58 can be set on the drive 53. According to a control signal from the CPU 56, execution programs stored in the storage medium 58 are installed via the drive 53 into the secondary storage 54.

The secondary storage 54 may be implemented by a storage device such as a hard disk drive (HDD) or a solid state drive (SSD). According to a control signal from the CPU 56, the secondary storage 54 stores and outputs an execution program (display control program) of the present embodiment and control programs provided for the computer. Also, the secondary storage 54 reads necessary information stored therein and writes information according to control signals from the CPU 56.

The main memory 55 stores execution programs read by the CPU 56 from the secondary storage 54. The main memory 55 may be implemented by, for example, a read-only memory (ROM) and/or a random access memory (RAM).

The CPU 56 controls the entire computer (the server 11) according to control programs such as an operating system (OS) and execution programs stored in the main memory 55 to perform, for example, various calculations and data input/output between the CPU 56 and other hardware components. The CPU 56 may obtain Information necessary for the execution of execution programs from the secondary storage 54 and store execution results in the secondary storage 54.

For example, the CPU 56 loads a program installed in the secondary storage 54 onto the main memory 55 and executes the loaded program according to an execution instruction input via the input device 51 to perform various processes. More specifically, the CPU 56 executes a display control program to cause the registration unit 23 to register AR contents and decision criteria (e.g., bright and dark areas and feature point information in an image) used to determine whether to output AR contents, cause the retrieval unit 24 to retrieve various types of information, and cause the control unit 25 to perform a display control process. Processes performed by the CPU 56 are not limited to those described above. Results of processes performed by the CPU 56 may be stored in the secondary storage 54 as necessary.

The network connection device 57 communicates via the communication network 13 with the terminals 12 and other external apparatuses. According to a control signal from the CPU 56, the network connection device 57 connects the server 11 to, for example, the communication network 13 to obtain execution programs, software, and setting information from external apparatuses. Also, the network connection device 57 may be configured to provide results obtained by executing programs to the terminals 12, and to provide an execution program of the present embodiment to external apparatuses.

The storage medium 58 is a computer-readable storage medium storing, for example, execution programs. As a non-limiting example, the storage medium 58 may be implemented by a semiconductor memory such as a flash memory or a portable storage medium such as a CD-ROM or a DVD.

With the hardware configuration (hardware resources) as illustrated by FIG. 4 and installed execution programs (software resources) such as a display control program, the computer (the server 11) can perform a display control process of the present embodiment.

<Hardware Configuration of Terminal>

Figure 5:
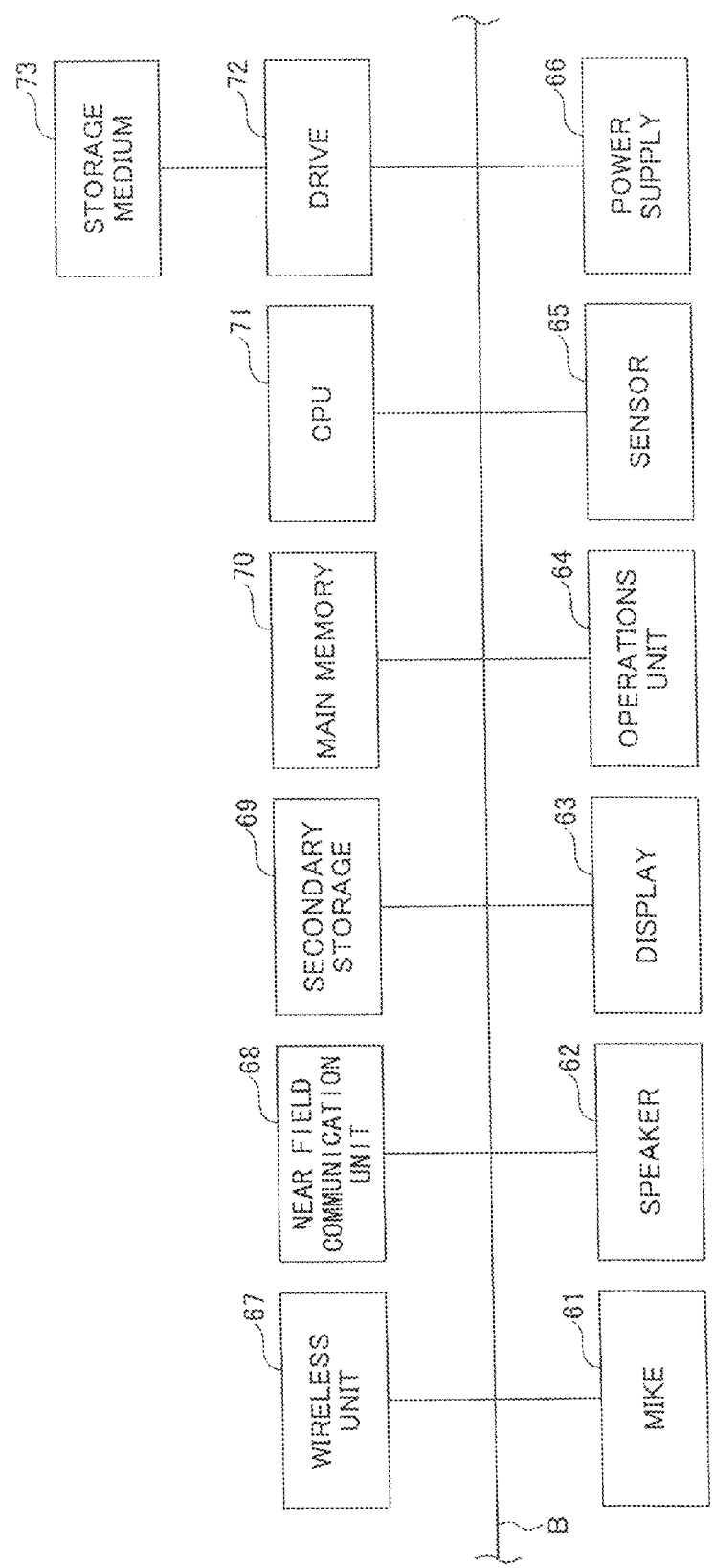
FIG. 5 is a block diagram illustrating an exemplary hardware configuration of a terminal.

An exemplary hardware configuration of the terminal 12 is described below. FIG. 5 is a block diagram illustrating an exemplary hardware configuration of the terminal 12. As illustrated by FIG. 5, the terminal 12 may include a microphone (MIKE) 61, a speaker 62, a display 63, an operations unit 64, a sensor 65, a power supply 66, a wireless unit 67, a near field communication unit 68, a secondary storage 69, a main memory 70, a CPU 71, and a drive 72 that are connected to each other via a system bus B.

The microphone 61 inputs voice uttered by a user and other sounds. The speaker 62 outputs voice of a communication partner and other sounds such as ringtone. The microphone 61 and the speaker 62 may be used to talk with a communication partner using a call function, and may also be used for input and output of various types of audio information.

The display 63 displays, for a user, screens defined in the OS and various applications. When the display 63 is a touch panel display, the display 63 also functions as an input/output unit.

The display 63 may be implemented, for example, by a liquid crystal display (LCD) or an organic electroluminescence (EL) display.

The operations unit 64 may be implemented, for example, by operation buttons displayed on a screen of the display 63 or operation buttons provided outside of the terminal 12. The operation buttons may include, for example, a power button, a volume control button, and/or character input keys arranged in a predetermined order.

When a user performs operations or presses the operation buttons on the screen of the display 63, the display 63 detects positions on the screen touched by the user. The display 63 can also display, on the screen, application execution results, contents, icons, a cursor, and so on.

The sensor 65 detects temporary and continuous movements of the terminal 12. As a non-limiting example, the sensor 65 detects a tilt angle, acceleration, an orientation, and a position of the terminal 12. The sensor 65 may include, but is not limited to, a tilt sensor, an acceleration sensor, a gyro sensor, and/or a global positioning system (GPS) sensor.

The power supply 66 supplies power to other components of the terminal 12. The power supply 66 is, for example, but is not limited to, an internal power source such as a battery. The power supply 66 can also monitor its remaining power level by detecting the power level continuously or at predetermined intervals.

The wireless unit 67 is a transceiver that receives a radio signal (communication data) via, for example, an antenna from a base station and sends a radio signal (communication data) via the antenna to the base station. With the wireless unit 67, the terminal 12 can send and receive data via a base station and the communication network 13 to and from the server 11.

The near field communication unit 68 performs near-field communications with computers such as other terminals 12 using a communication technology such as infrared communication, WiFi (registered trademark), or Bluetooth (registered trademark). The wireless unit 67 and the near field communication unit 68 are examples of communication interfaces that enable the terminal 12 to send and receive data to and from other computers.

The secondary storage 69 is a storage device such as an HDD or an SSD. The secondary storage 69 stores programs and data, and performs data input/output as necessary.

The main memory 70 stores execution programs read by the CPU 71 from the secondary storage 69, and stores information obtained during the execution of the programs. The main memory 70 is, for example, but is not limited to, a ROM or a RAM.

The CPU 71 controls the entire terminal 12 (i.e., a computer) according to control programs such as an OS and execution programs stored in the main memory 70 to perform, for example, various calculations and data input/output between the CPU 71 and other hardware components, and thereby performs display control processes.

For example, the CPU 71 loads a program installed in the secondary storage 69 onto the main memory 70 and executes the loaded program according to an execution instruction input via the operations unit 64 to perform various processes. More specifically, the CPU 71 executes a display control program to cause the setting unit 35 to set AR contents and decision criteria, and cause the recognition unit 36 to recognize a reference object such as an AR marker 36. Also, the CPU 71 causes the acquisition unit 37 to obtain characteristic information, causes the determination unit 38 to perform a determination process, causes the content generation unit 39 to generate an AR content, and causes the image generation unit 40 to generate an image. Processes performed by the CPU 71 are not limited to those described above. Results of processes performed by the CPU 71 may be stored in the secondary storage 69 as necessary.

The storage medium 73 can be detachably set on the drive 72. The drive 72 can read and write information from and onto the set storage medium 73. The drive 72 is, for example, but is not limited to, a storage medium slot.

The storage medium 73 is a computer-readable storage medium storing, for example, execution programs. Examples of the storage medium 73 include, but are not limited to, a semiconductor memory such as a flash memory or a portable storage medium such as a USB memory.

With the hardware configuration (hardware resources) as illustrated by FIG. 5 and installed execution programs (software resources) such as a display control program, the computer (the terminal 12) can perform a display control process of the present embodiment.

A display control program for implementing a display control process of the present embodiment may be resident on a computer or activated in response to a start instruction.

<Examples of AR Markers>

Figure 6B:
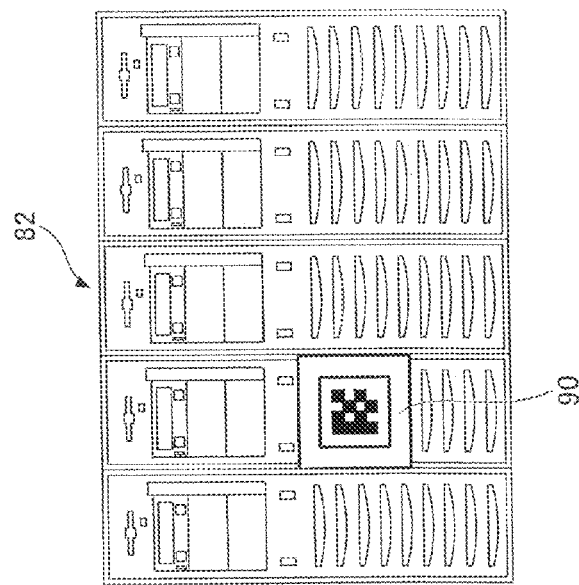
FIGS. 6A and 6B are drawings illustrating examples where AR markers are placed on physical objects.
Figure 6A:
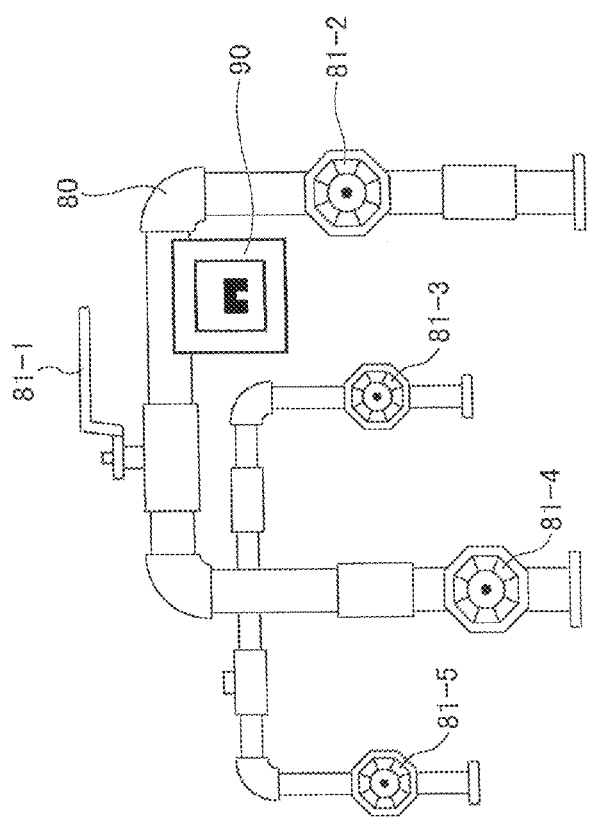

Examples of AR markers are described below. FIGS. 6A and 6B are drawings illustrating examples where AR markers are placed on physical objects. FIG. 6A illustrates a pipe 80 that is an example of a physical object in a real space. The pipe 80 includes valves 81-1 through 81-5. An AR marker 90 is attached to the pipe 80 such that the AR marker 90 can be captured together with the pipe 80.

In the present embodiment, an image of the AR marker 90 and the pipe 80 is captured using the imaging unit 32 of the terminal 12. The recognition unit 36 performs image recognition on the captured image to obtain identification information of the AR marker 90. Then, the acquisition unit 37 obtains characteristic information (e.g., bright/dark area information (first characteristic information) and feature point information (second characteristic information)) that is associated with the identification information obtained by the recognition unit 36 and defined by coordinates relative to the AR marker 90. Also, the determination unit 38 determines whether the captured image including the AR marker 90 recognized by the recognition unit 36 includes the characteristic information (decision criterion) associated with the identification information of the AR marker 90. For example, the determination unit 38 determines whether characteristics of an image area in the captured image match characteristics indicated by the first characteristic information.

When the characteristics of the image area match the characteristics indicated by the first characteristic information (determination result: affirmative), the determination unit 38 determines that the image has been captured at a correct position. In this case, the content generation unit 38 superimposes, on the image captured or being captured, an AR content indicating instructions to operate the valves 81-1 through 81-5 of the pipe 80 that is an object set in association with the identification information of the AR marker 90. Alternatively, the content generation unit 39 may register a new AR content for the AR marker 90. On the other hand, when the characteristics of the image area do not match the characteristics indicated by the first characteristic information (determination result: negative), the content generation unit 38 superimposes an AR content for a negative determination result on the image captured or being captured.

A user (e.g., an operator) can operate the valves 81-1 through 81-5 to control the pipe 80 according to the AR content displayed on a screen of the terminal 12. The AR content may be shared by multiple users.

The AR content obtained from the AR marker 90 is not limited to instructions to operate the valves 81-1 through 81-5. For example, the AR content may represent information (e.g., caution or warning) for reporting to the user that the pipe 80 is damaged (e.g., cracked) and needs to be repaired.

One or more AR markers 90 may be provided for one object (e.g., the pipe 80), and one AR marker 90 may be provided for multiple objects. When multiple AR markers exist in an image, a determination process may be performed using a common decision criterion for the AR markers, and an AR content(s) may be displayed based on the result of the determination process.

In the example of FIG. 6B, the AR marker 90 is attached to a server rack 82 for housing computers such as servers. An AR content may be obtained by capturing an image of the AR marker 90 together with the server rack 82, and performing image recognition on the captured image. In this case, the AR content may represent, for example, operational instructions or maintenance information (e.g., operation schedule and contact information for repair) for the server rack 82.

Examples of AR marker 90 include, but are not limited to, two-dimensional codes such as a bar code and a QR code (registered trademark), and multidimensional codes using, for example, colors. Objects for which AR contents are displayed using the AR marker 90 are not limited to those described above.

<Processes Performed by Terminal>

Exemplary processes performed by the terminal 12 are described below. There are roughly two types of processes performed by the terminal 12. In a first process, a user such as an administrator or an operator uses the terminal 12 to set a decision criterion and an AR content in association with an AR marker. In a second process, a user uses the terminal 12 to recognize an AR marker and display an AR content associated with the AR marker. In performing the above processes, the administrator and the operator may share one terminal 12, or may use separate terminals 12 assigned to them. The two types of processes are described separately below.

Process of Setting Decision Criterion and AR Content: First Embodiment

Figure 7:
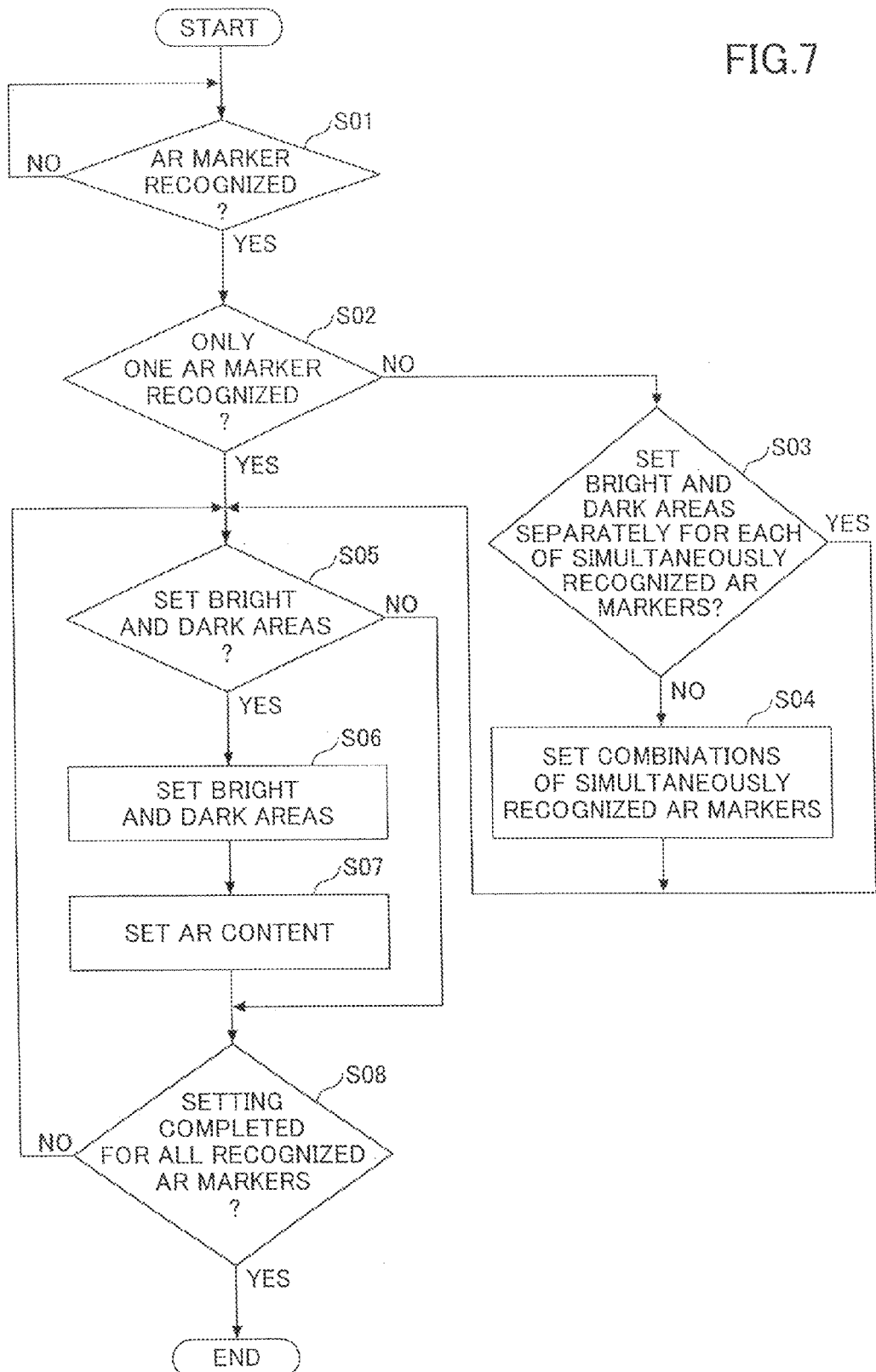
FIG. 7 is a flowchart illustrating an exemplary process of setting a decision criterion and an AR content according to a first embodiment.

FIG. 7 is a flowchart illustrating an exemplary process of setting a decision criterion and an AR content according to a first embodiment. In the example of FIG. 7, the recognition unit 36 of the terminal 12 determines whether an AR marker has been recognized in an image captured by a user such as an administrator or an operator using the imaging unit 32 (S01). When no AR marker has been recognized (NO at S01), the recognition unit 36 of the terminal 12 waits until an AR marker is recognized. The process may be terminated when no AR marker is recognized for a predetermined period of time or more.

When an AR marker(s) has been recognized (YES at S01), the setting unit 35 of the terminal 12 determines whether only one AR marker has been recognized (S02). When more than one AR marker has been recognized simultaneously (NO at S02), the setting unit 35 of the terminal 12 determines whether to set bright and dark areas separately for each of the simultaneously-recognized AR markers (S03). The determination at step S03 may be performed based on a user input or preset information.

When it is determined to not set bright and dark areas separately for each of the simultaneously recognized AR markers (NO at S03), the setting unit 35 of the terminal 12 sets one or more combinations of the simultaneously-recognized AR markers (S04). In this case, bright and dark areas are set for each of the combinations. That is, each combination defines AR markers for which common image characteristic information is set when the AR markers are captured at the same time. The combinations of AR markers may be set at step S04 according to a user input.

When it is determined to set bright and dark areas separately for each of the simultaneously recognized AR markers (YES at S03) or after step S04, the setting unit 35 of the terminal 12 determines whether to set bright and dark areas for each AR marker or each combination of AR markers (S05). When it is determined to set bright and dark areas (YES at S05), the setting unit 35 of the terminal 12 sets bright and dark areas for each AR marker or each combination of AR markers (S06). At step S06, the captured image is, for example, binarized, and bright and dark areas are set based on the binarized image. Details of a process of setting bright and dark areas are described later. Next, the setting unit 35 of the terminal 12 sets an AR content(s) for each of the recognized AR marker (S07). The AR content is generated by the content generation unit 39. Different AR contents may be set for a case where the result of a determination process performed using the bright and dark areas set at step S6 is affirmative and for a case where the result is negative.

When it is determined to not set bright and dark areas at step S05 (NO at S05) or after step S07, the setting unit 35 of the terminal 12 determines whether all of the recognized AR markers have been processed (S08). When not all of the recognized AR markers have been processed (NO at S08), the setting unit 35 of the terminal 12 returns to step S05.

When all of the recognized AR markers have been processed (YES at S08), the setting unit 35 of the terminal 12 terminates the process.

<Exemplary Setting of Bright and Dark Areas>

FIG. 8 is a drawing illustrating an exemplary setting of bright and dark areas. As exemplified by FIG. 8, one or both of a dark area and a bright area are set in a three-dimensional coordinate system (X, Y, Z) (marker coordinate system) having its origin at the center of the AR marker 90 (reference object) included in an image 100 captured by the terminal 12. The coordinate system used to define bright and dark areas is not limited to a three-dimensional coordinate system. For example, a two-dimensional coordinate system (X, Y) may instead be used.

In the example of FIG. 8, the image 100 is segmented into upper and lower areas relative to the center of the AR marker 90, average luminance values of pixels in the upper and lower areas are obtained, and the average luminance values are compared with each other. One of the upper and lower areas with the lower average luminance value is defined as a dark area, and another one of the upper and lower areas with the higher average luminance value is defined as a bright area, Then, information (e.g., coordinates of corners of rectangles) indicating the bright and dark areas is obtained. Alternatively, the average luminance values may be compared with a predetermined threshold. In this case, an area whose average luminance value is greater than the threshold is determined as a bright area, and an area whose average luminance value is less than or equal to the threshold is determined as a dark area.

The image 100 may also be segmented into areas in any other manner relative to the AR marker 90. For example, the image 100 may be segmented into right and left areas relative to the AR marker 90, or into upper right, upper left, lower right, and lower left areas relative to the AR marker 90. When the image 100 is segmented into four equal areas, two of the areas with higher average luminance values may be set as bright areas, the other two of the areas with lower average luminance values may be set as dark areas, and information indicating the respective areas may be obtained. Alternatively, one of the four areas with the lowest average luminance value may be set as a dark area, and another one of the four areas with the highest average luminance value may be set as a bright area. Also, each of the four areas may be determined either as a bright area or a dark area by comparing its average luminance value with a predetermined threshold.

In the present embodiment, when bright and dark areas are set as characteristic information of the image 100, i.e., as a decision criterion, an AR content 101 and its display position are set for each of a case where the decision criterion is satisfied and a case where the decision criterion is not satisfied. The display position may be defined by coordinates in a marker coordinate system relative to the center of the AR marker 90, or by coordinates in a screen coordinate system relative to a position in a captured image. The display position of the AR content 101 is preferably set in a blank area in the image 100 so that objects in a captured image are not hidden by the AR content 101 superimposed on the captured image.

Examples of Data: First Embodiment

Next, examples of data used in the first embodiment are described. FIGS. 9A through 9C are tables illustrating examples of data stored in the terminal 12 according to the first embodiment. FIGS. 10A through 10C are tables illustrating exemplary data stored in the server 11 according to the first embodiment.

FIG. 9A is an example of a data management table, FIG. 9B is an example of an AR content management table, and FIG. 9C is an example of a bright/dark area management table of the terminal 12.

Fields of the data management table of FIG. 9A include, but are not limited to, "marker ID", "affirmative AR content ID", "negative AR content ID", and "bright/dark area ID".

The marker ID field contains identification information (marker ID) of an AR marker. The affirmative AR content ID field contains identification information (affirmative AR content ID) of an AR content(s) that is displayed when it is determined in a determination process that the AR marker has been captured at a correct position (e.g., a position set by an administrator) (affirmative determination result). The negative AR content ID field contains identification information (negative AR content ID) of an AR content(s) that is displayed when it is determined in a determination process that the AR marker has been captured at an incorrect position (negative determination result). The bright/dark area ID field contains identification information (bright/dark area IDs) of bright and dark areas that are used as an example of characteristic information of an image. Detailed information (e.g., positional information) of an area is obtained from the bright/dark area management table of FIG. 9C based on a bright/dark area ID in the bright/dark area ID field.

Fields of the AR content management table of FIG. 9B include, but are not limited to, "AR content ID", "coordinates", "rotation angle", "magnification/reduction ratio", and "texture path".

The AR content ID field contains identification information (AR content IDs) of AR contents and is associated with the affirmative AR content ID field and the negative AR content ID field of the data management table of FIG. 9A. The coordinates field contains, for each AR content, coordinates indicating a position where the AR content is displayed in a three-dimensional space (virtual space) of a captured image. In the non-limiting example of FIG. 9B, the coordinates indicate the center of each AR content. The rotation angle field contains, for each AR content, an angle by which the AR content is rotated in the three-dimensional space from a predetermined reference angle indicating, for example, a normal orientation of the AR content. The magnification/reduction ratio field contains, for each AR content, a magnification or reduction ratio with respect to a reference size. The texture path field contains, for each AR content, an address of a storage location where, for example, an image file for the AR content is stored. The storage location of an AR content may be accessed, for example, via the communication network 13. As a non-limiting example, the storage location may be provided on the server 11 or a Web site.

Fields of the bright/dark area management table of FIG. 9C include, but are not limited to, "bright/dark area ID", "coordinates", and "bright/dark value". The bright/dark area ID field of FIG. 9C is associated with the bright/dark area ID field of FIG. 9A. The coordinates field contains coordinates of each area. The coordinates are defined relative to the reference position of the AR marker 90 as illustrated by FIG. 8.

After being set at the terminal 12, the data illustrated by FIGS. 9A through 9C is sent to the server 11 and is managed at the server 11. After being correctly sent to the server 11, the data may be removed from the terminal 12.

FIG. 10A is an example of a marker ID management table, FIG. 10B is an example of an AR content management table, and FIG. 10C is an example of a bright/dark area management table of the server 11.

Fields of the marker ID management table of FIG. 10A include, but are not limited to, "marker ID", "affirmative AR content ID", "negative AR content ID", and "bright/dark area ID".

Fields of the AR content management table of FIG. 10B include, but are not limited to, "AR content ID", "coordinates", "rotation angle", "magnification/reduction ratio", and "texture path".

Fields of the bright/dark area management table of FIG. 10C include, but are not limited to, "bright/dark area ID", "coordinates", and "bright/dark value". The value "1/2" stored in the marker ID field of FIG. 10A indicates common bright and dark areas are set for a combination of AR markers with marker IDs "1" and "2". Any other notation may also be used for this purpose.

The fields in FIGS. 10A through 10C contain information items that are stored in the corresponding fields of FIGS. 9A through 9C. The server 11 may manage those information items obtained from one or more terminals 12. In this case, the tables of FIGS. 10A through 10C may also include a field containing identification information of the terminals 12 that registered the information items.

<Method of Setting Bright/Dark Areas>

An exemplary method of setting bright and dark areas (bright/dark area information) is described below. In the present embodiment, when setting a decision criterion, an AR marker and its background image are binarized, and bright/dark area information of the binarized image is registered in the server 11.

Also, in a determination process, the determination unit 38 binarizes a background image of a recognized AR marker, and obtains bright/dark area information of the binarized image. For example, a binarization process is performed during a process of recognizing a marker ID. Also, the determination unit 38 compares the obtained bright/dark area information of the background image with bright/dark area information of a background image registered beforehand in the server 11. Different AR contents (superimposed information) are displayed depending on whether the two sets of bright/dark area information match.

Figure 11:
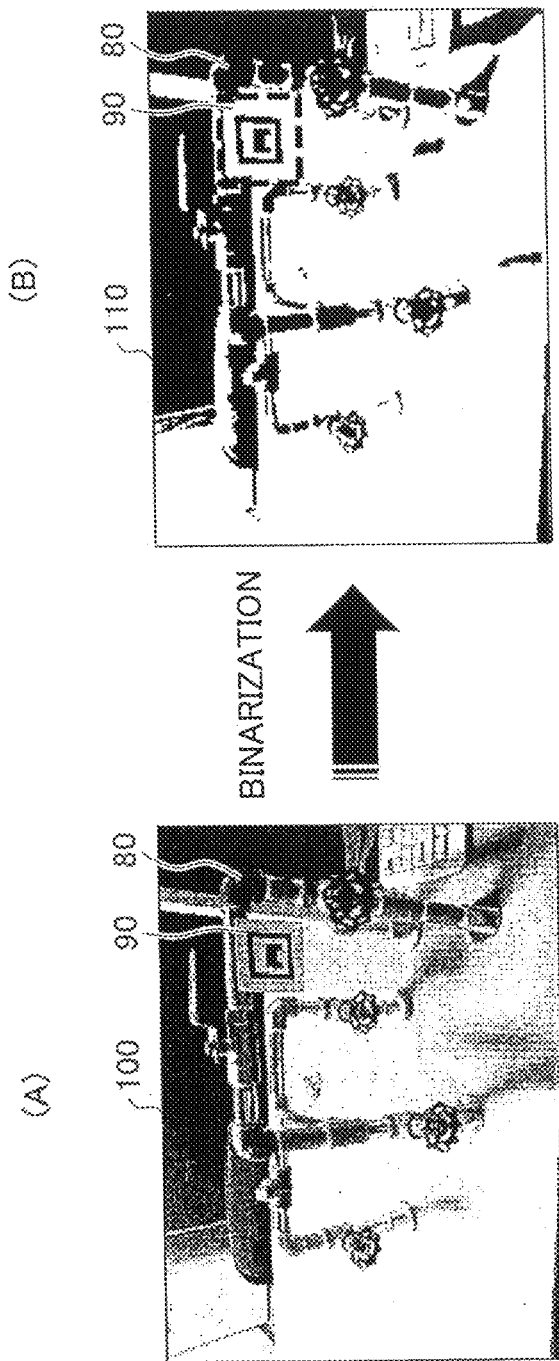
FIG. 11 is a drawing illustrating an exemplary binarized image.

FIG. 11 is a drawing illustrating an exemplary binarized image. FIG. 11 (A) illustrates a captured image 100 before binarization, and FIG. 11 (B) illustrates a binarized image 110 after binarization. The captured image 100 of FIG. 11 (A) includes the pipe 80 of FIG. 6A as an object. The captured image 100 also includes the AR marker 90 as an example of a reference object.

In the present embodiment, the acquisition unit 37 of the terminal 12 performs general image processing on the captured image 100 to obtain the binarized image 110. White or black is set for each pixel of the binarized image 110 based on luminance information of the corresponding pixel of the captured image 100 and a predetermined threshold (e.g., a luminance value of "123"). An exemplary method of binarization is described below. In an exemplary binarization process described below, it is assumed that a full color image (each of RGB colors can be expressed by a value in a range from 0 to 255) in an RGB color system is binarized. However, calculations below may also be applied to an image in any other color system as long as luminance (brightness) values of pixels can be calculated. A luminance value (white or black) of each pixel in an image can be calculated using a formula below.

$$\text{Luminance value} = (\sqrt{R^2} + \sqrt{G^2} + \sqrt{B^2})/3$$

Also, the highest value (black: dark) and the lowest value (white: bright) of pixels in the image are calculated using formulas below.

$$\text{Black} = (\sqrt{0^2} + \sqrt{0^2} + \sqrt{0^2})/3$$

$$\text{White} = \sqrt{255^2} + \sqrt{255^2} + \sqrt{255^2})/3$$

From the above two formulas, the mean value of luminance is uniquely determined as "127" (or "128"). This mean value is used as a threshold to binarize each pixel and thereby binarize the image. For example, using the threshold, each of exemplary pixel values 1 through 3 below is converted into "0" (dark) or "1" (bright).

Pixel value $1=(\sqrt{255^2}+\sqrt{0^2}+\sqrt{0^2})/3=85 \Rightarrow$ "dark (0)"

Pixel value $2=(\sqrt{255^2}+\sqrt{255^2}+\sqrt{0^2})/3=170 \Rightarrow$ "bright (1)"

Pixel value $3=(\sqrt{127^2}+\sqrt{255^2}+\sqrt{255^2})/3=212 \Rightarrow$ "bright (1)"

Figure 12:
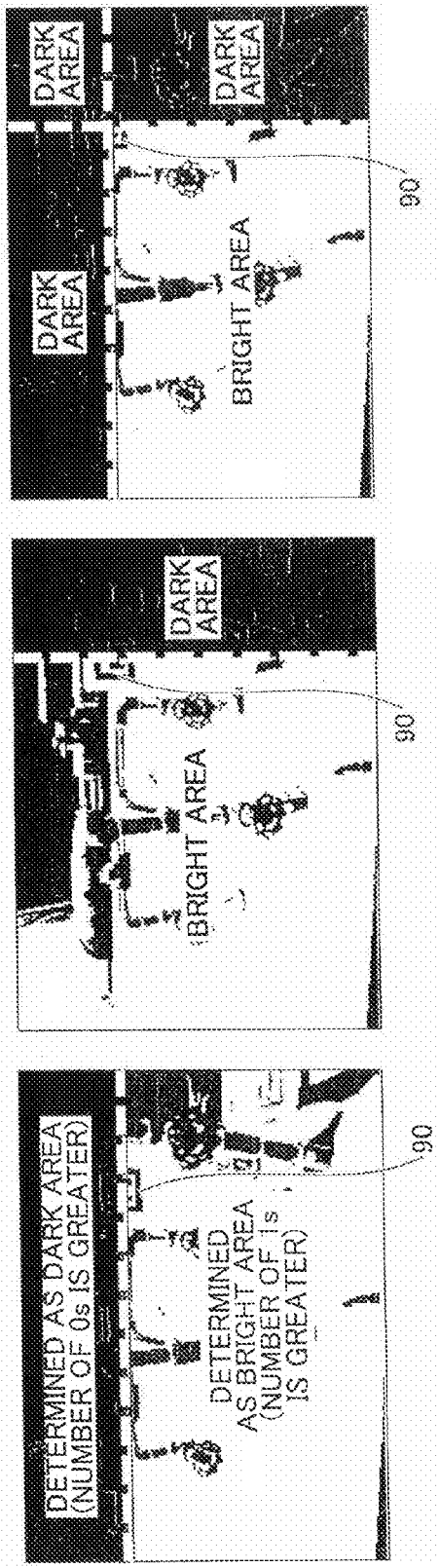
FIGS. 12A through 12C are drawings illustrating exemplary segmentation of a binarized image.

FIGS. 12A through 12C are drawings illustrating exemplary segmentation of a binarized image. In each of FIGS. 12A through 12C, a binarized image is segmented into areas, and the areas are set as bright and dark areas. In the example of FIG. 12 (A), the binarized image is segmented into upper and lower areas using a horizontal axis passing through the center of the AR marker 90 as a boundary. In the example of FIG. 12B, the binarized image is segmented into right and left areas using a vertical axis passing through the center of the AR marker 90 as a boundary. In the example of FIG. 12C, the binarized image is segmented into upper right, upper left, lower right, and lower left areas using the horizontal and vertical axes as boundaries.

In the present embodiment, the number of bright pixels (luminance value: 1) and the number of dark pixels (luminance value: 0) in each segmented area are calculated, and the segmented area is determined as a bright area or a dark area based on the larger one of the number of bright pixels and the number of dark pixels. For example, when the number of bright pixels (1) is greater than the number of dark pixels (0) in an area, the area is determined as a bright area. On the other hand, when the number of dark pixels (0) is greater than the number of bright pixels (1) in an area, the area is determined as a dark area. When the number of bright pixels (1) and the number of dark pixels (0) in an area are the same, the area is determined as a bright or dark area according to a predetermined rule. Bright and dark areas can be determined as described above for each of FIGS. 12A through 12C regardless of the number of segmented areas.

The number of bright pixels and the number of dark pixels may be calculated using all pixels in a segmented area, or using pixels extracted from the segmented area at predetermined intervals. Using pixels extracted at predetermined intervals makes it possible to reduce time necessary to determine bright and dark areas. The determined bright and dark areas are identified, for example, by coordinates.

The segmentation of a binarized image is performed by the setting unit 35. The setting unit 35 may be configured to be able to change the manner of dividing a binarized image according to image processing accuracy or determination accuracy required. Also, instead of using the position of the AR marker 90 as a reference position as described above, the setting unit 35 may be configured to segment a binarized image into four areas using horizontal and vertical axes that pass through the center of the binarized image (or the captured image 100), and set bright and dark areas for the segmented areas.

The method of setting segmented areas may be changed by changing a parameter via a program or according to a user input. Also, bright and dark areas in an image may be set using a predefined shape (template) such as a circle, an ellipse, a rectangle, a triangle, or a polygon.

After the AR marker 90 is recognized, the determination unit 38 compares bright/dark area information of a captured image with the decision criterion (bright/dark area information) that is set beforehand as illustrated by FIGS. 12A through 12C to determine whether the AR marker 90 is captured at a correct (predetermined) position, and displays appropriate information (AR content) based on the determination result.

<Methods of Setting Bright and Dark Areas when Multiple Ar Markers are Included in Captured Image>

Figure 13:
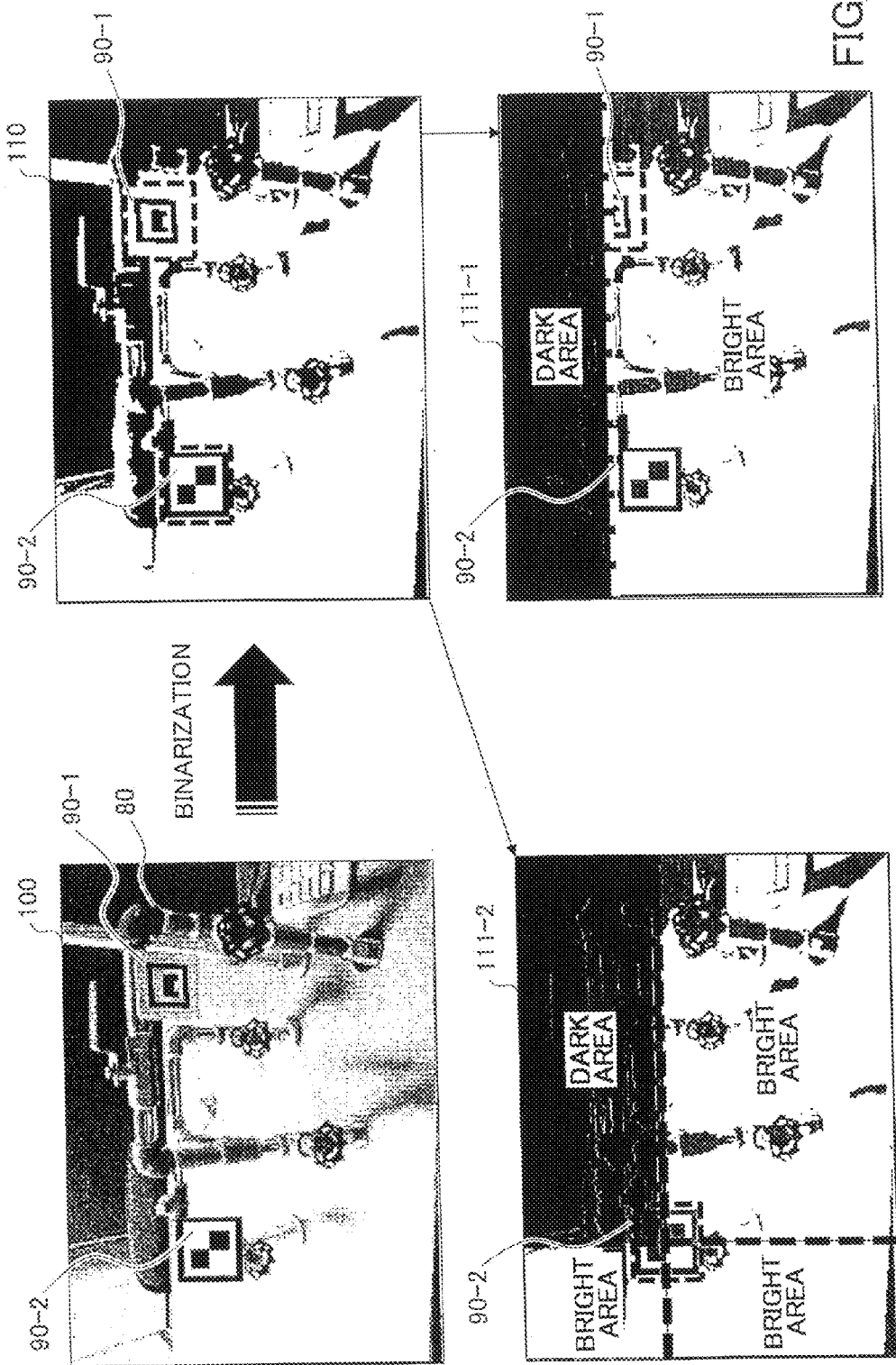
FIG. 13 is a drawing illustrating a first exemplary method of setting bright and dark areas when multiple AR markers exist.

Next, exemplary methods of setting bright and dark areas when multiple AR markers are included in a captured image are described. FIG. 13 is a drawing illustrating a first exemplary method of setting bright and dark areas when multiple AR markers exist. In the first exemplary method, bright and dark areas (decision criterion) are set separately for each of multiple AR markers in the captured image 100.

In the example of FIG. 13, two AR markers 90-1 and 90-2 are included in the captured image 100 captured by the imaging unit 32. The setting unit 35 binarizes the captured image 100 to obtain the binarized image 110. Also, the setting unit 35 sets bright and dark areas (decision criterion) for each of the AR markers 90-1 and 90-2 in the binarized image 110 to obtain area-set images 111-1 and 111-2. In the non-limiting example of FIG. 13, upper and lower segmented areas are set as bright and dark areas for the AR marker 90-1, and upper right, upper left, lower right, and lower left segmented areas are set as bright and dark areas for the AR marker 90-2.

With this method, even when multiple AR markers exist in a captured image, a determination process can be performed for each AR marker based on a corresponding decision criterion, and an AR content associated with the AR marker can be displayed when the determination result is affirmative. Also, the terminal 12 may be configured such that an AR content is displayed only when the results of both of the determination processes performed for the AR marker 90-1 and 90-2 are affirmative. Further, the terminal 12 may be configured such that no AR content is displayed when at least one of the results of determination processes performed for multiple AR markers is negative.

Figure 14:
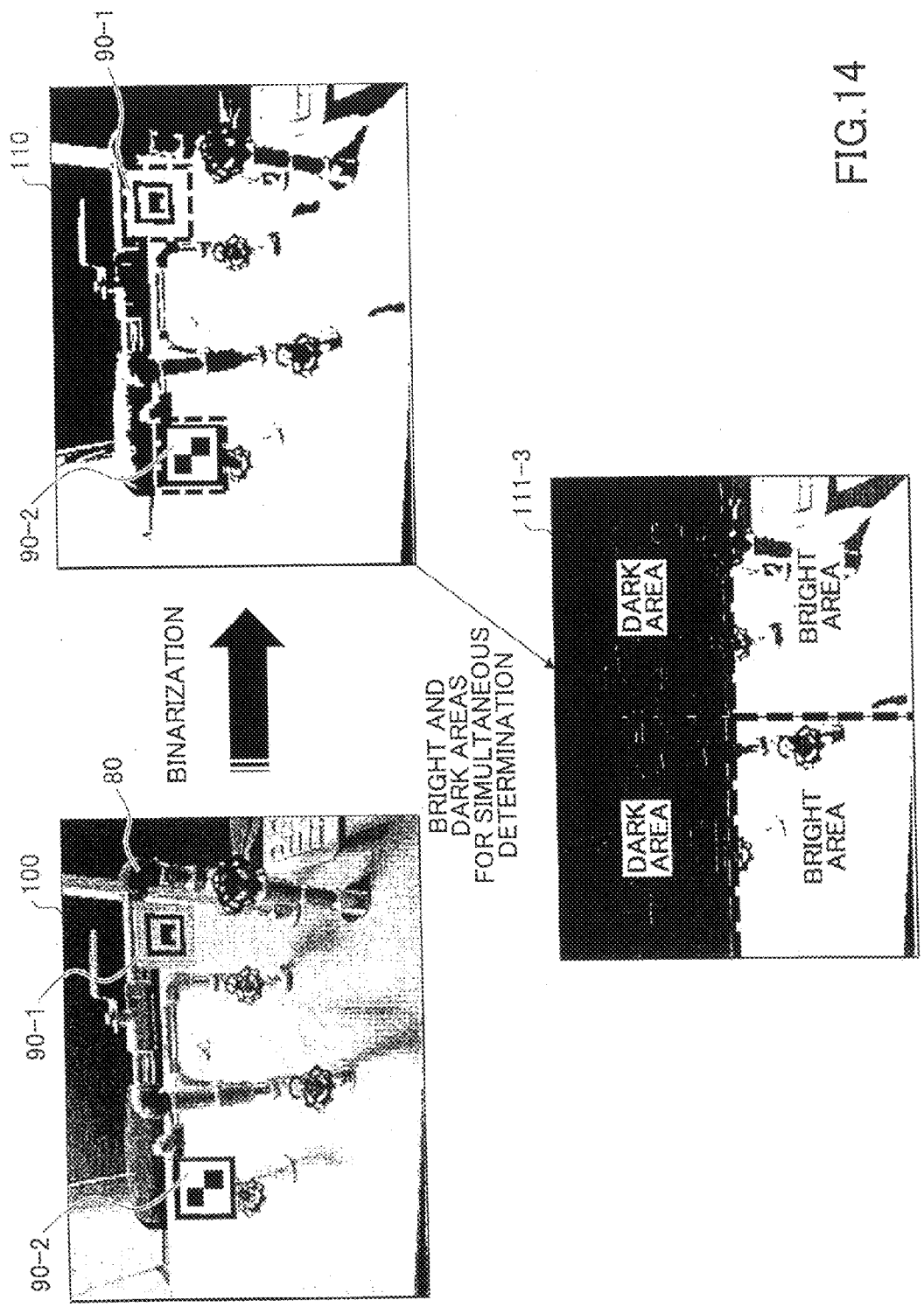
FIG. 14 is a drawing illustrating a second exemplary method of setting bright and dark areas when multiple AR markers exist.

FIG. 14 is a drawing illustrating a second exemplary method of setting bright and dark areas when multiple AR markers exist. In FIG. 14, similarly to FIG. 13, two AR markers 90-1 and 90-2 are included in the captured image 100. In the second exemplary method, common bright and dark areas are set as a common decision criterion for the AR markers 90-1 and 90-2 in the binarized image 110. In the non-limiting example of FIG. 14, an area-set image 111-3 is segmented into four areas using horizontal and vertical axes that pass through the center of the area-set image 111-3, and the segmented areas are set as bright and dark areas.

In the case of the second exemplary method, when the AR markers 90-1 and 90-2 are recognized in the captured image 100, a determination process is performed based on the common decision criterion. When the common decision criterion is satisfied (determination result: affirmative), AR contents associated with the two AR markers 90-1 and 90-2 are displayed. Thus, with the second exemplary method of FIG. 14, even when multiple AR markers are simultaneously recognized in a captured image, the determination process based on bright and dark areas needs to be performed only once. Also, when multiple AR markers are recognized in a captured image, combinations of the AR markers may be set, and a common decision criterion may be set for each combination of the AR markers.

Determination Process: First Embodiment

Figure 15:
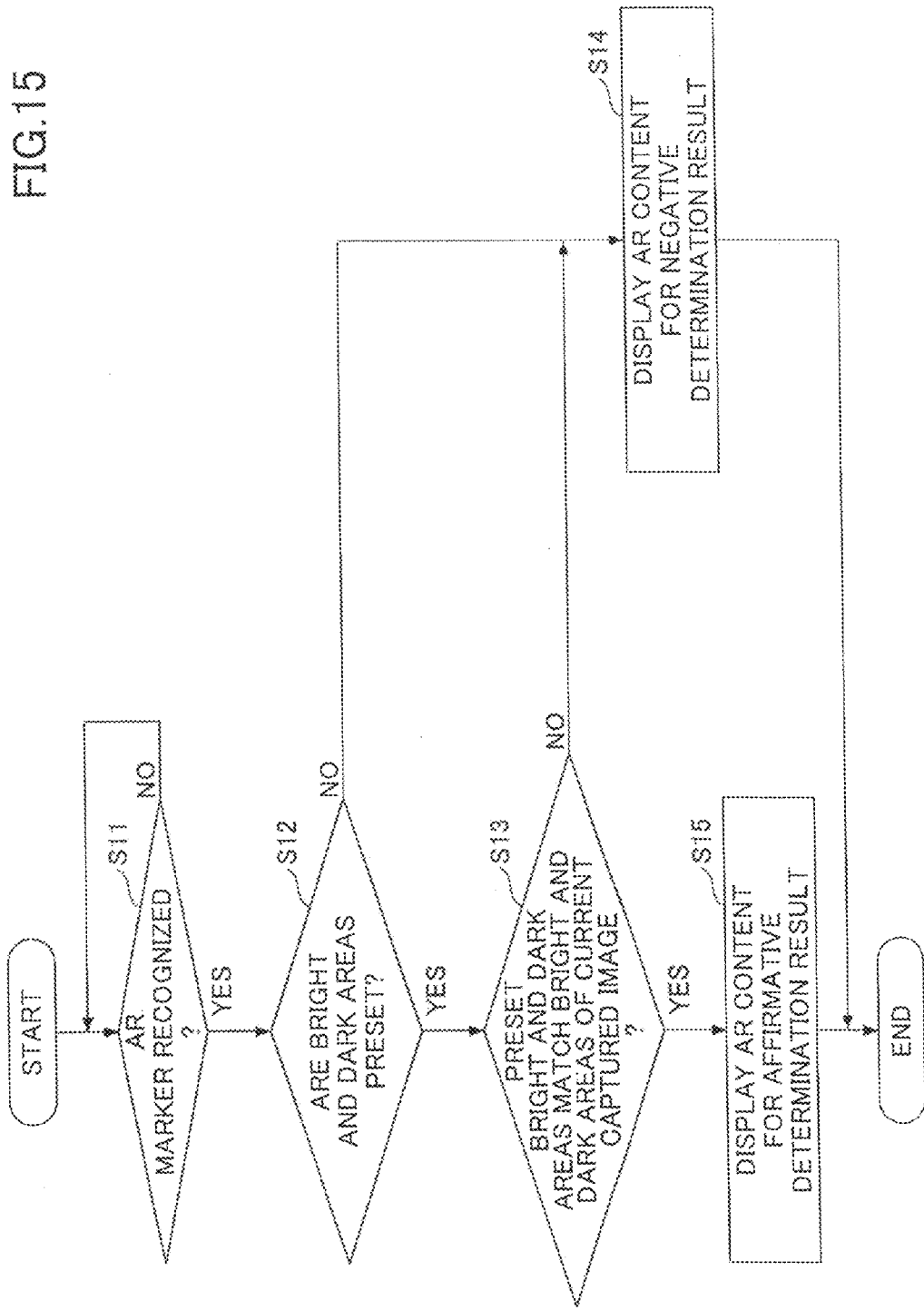
FIG. 15 is a flowchart illustrating an exemplary determination process according to the first embodiment.

FIG. 15 is a flowchart illustrating an exemplary determination process according to the first embodiment. In the example of FIG. 15, the recognition unit 36 of the terminal 12 determines whether the imaging unit 32 has started capturing an image, and whether an AR marker has been recognized in the image (current captured image) being captured (S11). When no AR marker has been recognized (NO at S11), the recognition unit 36 of the terminal 12 waits until an AR marker is recognized. The process may be terminated when no AR marker is recognized for a predetermined period of time or more.

When an AR marker has been recognized (YES at S11), the determination unit 38 of the terminal 12 determines whether bright and dark areas have been preset (S12). As a non-limiting example, whether bright and dark areas have been preset may be determined, for example, by sending a marker ID (identification information) obtained from the recognized AR marker to the server 11, obtaining a decision criterion corresponding to the marker ID and an AR content to be displayed according to a determination result, and determining whether the decision criterion includes bright/dark area information.

When bright and dark areas have been preset (YES at S12), the determination unit 38 of the terminal 12 determines whether the preset bright and dark areas match current bright and dark areas of the current captured image (S13). In step S13, when the coordinates of feature points corresponding to the preset bright and dark areas (or the coordinates of the preset bright and dark areas) do not completely match those of the current bright and dark areas but their differences are within a predetermined allowable range, it may be determined that the preset bright and dark areas match the current bright and dark areas. Also in step S13, it may be determined that the preset bright and dark areas match the current bright and dark areas when the current bright and dark areas include the preset bright and dark areas.

When bright and dark areas have not been preset (NO at S12) or when the preset bright and dark areas do not match the current bright and dark areas (NO at S13), the terminal 12 displays an AR content that is generated by the image generation unit 40 and used when the result of determination is negative (S14). Alternatively, the terminal 12 may be configured to display no AR content at step S14.

When the preset bright and dark areas match the current bright and dark areas (YES at S13), the terminal 12 displays an AR content that is generated by the image generation unit 40 and used when the result of determination is affirmative (S15).

Thus, the first embodiment makes it possible to determine whether an AR marker has been captured by a user at a correct position (or place) based on the AR marker and bright and dark area information of areas surrounding (or the background of) the AR marker. This in turn makes it possible to prevent output of superimposed information when an AR marker is recognized but a decision criterion is not satisfied. The first embodiment also makes it possible to control output of superimposed information on site. Accordingly, the first embodiment makes it possible to prevent superimposed information from being output based on an unauthorized copy of an AR marker and unauthorized use of a system.

Display Screens: First Embodiment

Figure 16:
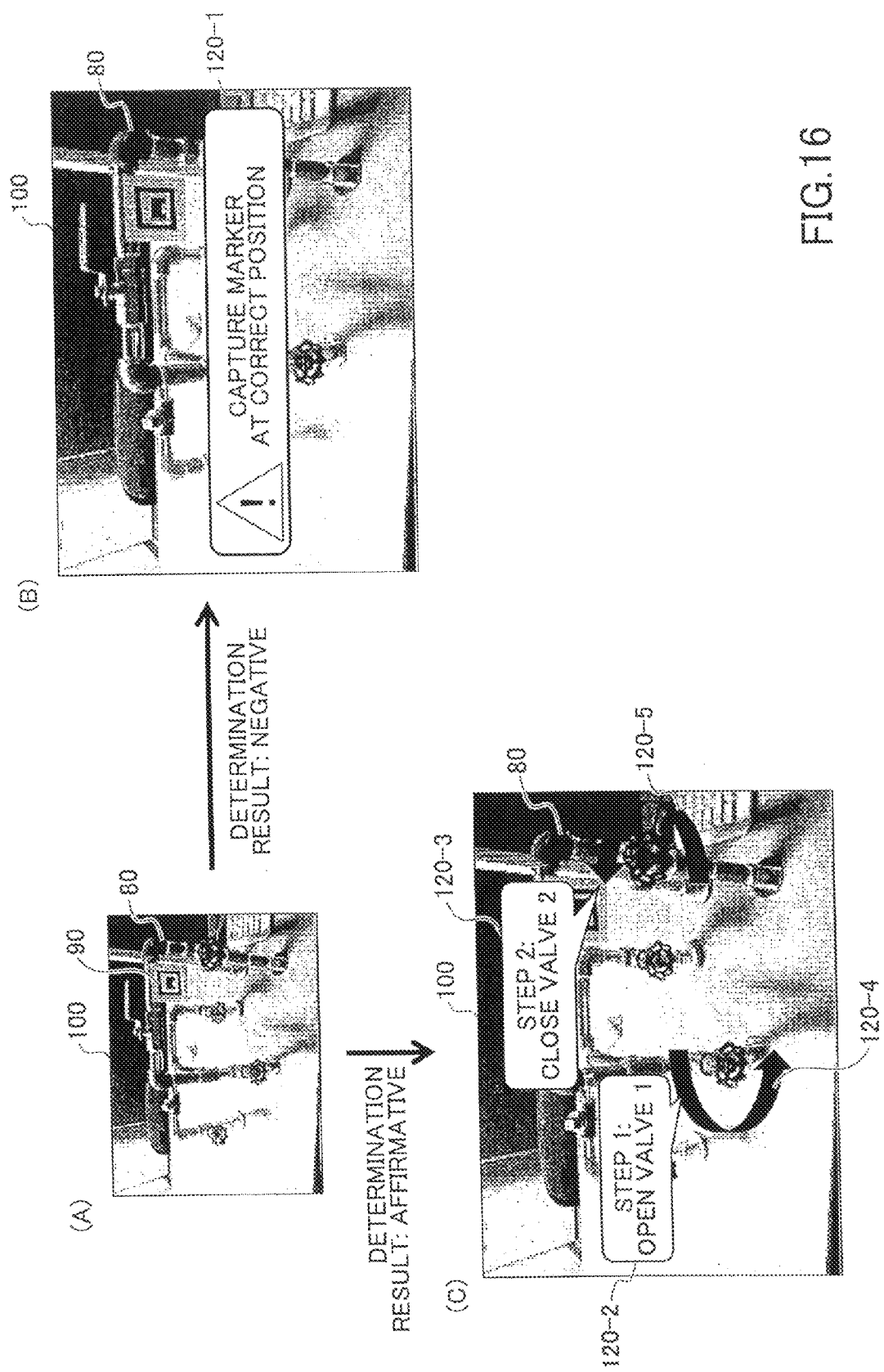
FIG. 16 is a drawing illustrating exemplary display screens according to the first embodiment.

FIG. 16 is a drawing illustrating exemplary display screens according to the first embodiment. FIG. 16 (A) is an example of a captured image captured by the terminal 12. When the terminal 12 recognizes the AR marker 90 attached to the pipe 80 (an example of an object for which an AR content(s) is to be displayed), the terminal 12 sends a marker ID of the AR marker 90 to the server 11, and obtains a decision criterion and an AR content(s) corresponding to the marker ID. Next, the terminal 12 performs a determination process based on the obtained decision criterion. When the result of the determination process is negative, an AR content 120-1 as exemplified by FIG. 16 (B) is displayed on a screen. In the non-limiting example of FIG. 16 (B), a message (AR content) "Capture marker at correct position" is superimposed on the captured image 100 and displayed. This configuration makes it possible to prevent an unauthorized user from viewing, for example, confidential information associated with the marker ID.

When the result of the determination process is affirmative, AR contents 120-2 through 120-5 associated with the AR marker 90 are superimposed on the captured image 100 and displayed as exemplified by FIG. 16 (C). The AR contents 120-2 through 120-5 are text and icons representing instructions for operating the valves 81 of the pipe 80. However, AR contents to be displayed are not limited to these examples. For example, a caution such as "Pipe is cracked!" may be displayed for the pipe 80.

When an AR marker is placed in an outdoor location or in an indoor location where sunlight enters through the window, the luminance (bright and dark areas) of a captured image varies depending on the weather and the time of day (e.g., daytime or night). For this reason, time information (e.g., time periods) may also be set beforehand as a parameter for determining a position where an image is captured, and decision criteria and AR contents may set in association with the time information.

FIGS. 17A through 17D are tables illustrating examples of data stored in the terminal 12 when time information is used. FIGS. 18A through 18D are tables illustrating examples of data stored in the server 11 when time information is used.

FIG. 17A is an example of a marker management table, FIG. 17B is an example of an AR content management table, FIG. 17C is an example of a time-period-dependent data management table, and FIG. 17D is an example of a bright/dark area management table.

Fields of the marker management table of FIG. 17A include, but are not limited to, "marker ID", "time period 1", and "time period 2". The marker ID field contains identification information (AR marker ID) of an AR marker. The time period 1 field and the time period 2 field contain time periods (time information) with which different sets of bright/dark area information are associated. Although two time periods are set in the example of FIG. 17A, any number of time periods may be set.

Fields of the AR content management table of FIG. 17B include, but are not limited to, "AR content ID", "coordinates", "rotation angle", "magnification/reduction ratio", and "texture path". The fields of the AR content management table of FIG. 17B are substantially the same as those of the AR content management table of FIG. 9B.

Fields of the time-period-dependent data management table of FIG. 17C include, but are not limited to, "time period ID", "affirmative AR content ID", "negative AR content ID", and "bright/dark area ID".

The time period ID field contains identification information of time periods in FIG. 17A. Time period IDs 1 and 2 correspond to the time periods 1 and 2 in FIG. 17A. In the example of FIG. 17C, identification information of affirmative AR contents (which are to be displayed when a determination result is affirmative), identification of negative AR contents (which are to be displayed when a determination result is negative), and identification information (bright/dark area IDs) of bright and dark areas are set in association with the time period IDs.

Fields of the bright/dark area management table of FIG. 17D include, but are not limited to, "bright/dark area ID", "coordinates", and "bright/dark value". The fields of the bright/dark area management table of FIG. 17D are substantially the same as those of the bright/dark area management table of FIG. 9C.

FIG. 18A is an example of a marker ID management table, FIG. 18B is an example of a time-period-dependent data management table, FIG. 18C is an example of an AR content management table, and FIG. 18D is an example of a bright/dark area management table.

Fields of the marker ID management table of FIG. 18A include, but are not limited to, "marker ID" and "time period ID". In the example of FIG. 18A, time period IDs are set for each marker ID.

Fields of the time-period-dependent data management table of FIG. 18B include, but are not limited to, "time period ID", "time period", "affirmative AR content ID", "negative AR content ID", and "bright/dark area ID".

In the example of FIG. 18B, a time period, bright/dark area IDs of bright and dark areas for the time period, and AR contents to be displayed depending on a determination result are associated with each time period ID. Also in the example of FIG. 18B, the time-period-dependent data management table includes affirmative AR content IDs of AR contents to be displayed when a determination result is affirmative and negative AR content IDs of AR contents to be displayed when a determination result is negative. However, the time-period-dependent data management table may be set such that no AR content is displayed when a determination result is negative.

Fields of the AR content management table of FIG. 18C include, but are not limited to, "AR content ID", "coordinates", "rotation angle", "magnification/reduction ratio", and "texture path". The fields of the AR content management table of FIG. 18C are substantially the same as those of the AR content management table of FIG. 10C.

Fields of the bright/dark area management table of FIG. 18D include, but are not limited to, "bright/dark area ID", "coordinates", and "bright/dark value". The fields of the bright/dark area management table of FIG. 18D are substantially the same as those of the bright/dark area management table of FIG. 10D.

By adding time periods to decision criteria and setting different bright and dark areas for the time periods, it is possible to perform a determination process taking into account a time period when an image is captured, and to display different AR contents depending on the determination result. FIGS. 19A and 19B are drawings illustrating examples of AR contents displayed according to the results of determination processes performed using time information. In the example of FIGS. 19A and 19B, different AR contents are displayed depending on time periods (i.e., situations where luminance of a captured image varies depending on sunlight or illumination).

In the example of FIG. 19A, when the luminance in an entire room where the AR marker 90 is placed is high during the daytime due to, for example, sunlight entering the room through the window, bright and dark areas as exemplified by an area-set image 111 are set as a decision criterion, and an AR content 120 is displayed when the captured image 100 captured during the daytime satisfies the decision criterion. In FIG. 19A, the AR content 120 associated with the AR marker 90 is displayed at a position defined relative to the center of the AR marker (i.e., defined by coordinates in a marker coordinate system). The AR content 120 in FIG. 19A represents an instruction for opening the valve 81-4 of the pipe 80. Any other type of AR content may also be displayed.

In the example of FIG. 19B, bright and dark areas during the evening or night are set as a decision criterion as exemplified by an area-set image 111, and an AR content 120 is displayed at a position defined in the marker coordinate system when the captured image 100 captured during evening or night satisfies the decision criterion. The AR content 120 in FIG. 19B represents an instruction for closing the valve 81-4 of the pipe 80. Any other type of AR content may also be displayed. Thus, with the example of FIGS. 19A and 19B, it is possible to instruct an operator to open the valve 81-4 during the daytime, and to instruct the operator to close the valve 81-4 during the evening or night.

Thus, as exemplified by FIGS. 19A and 19B, it is possible to set different decision criteria for the same AR marker captured at the same place depending on time periods when the AR marker is captured. This in turn makes it possible to display different AR contents depending on decision criteria that are satisfied in determination processes.

As described above, when only preset bright and dark areas of an image captured from one direction (e.g., a front view) are used as a decision criterion, the preset bright and dark areas may coincidently match current bright and dark areas of a current captured image even when the current captured image is captured at an incorrect position. To prevent this problem, the same AR marker may be captured from multiple predetermined angles, and a decision process may be performed based on bright and dark areas of multiple images captured from the multiple angles. In this case, whether to use a single image captured from one angle or multiple images capture from different angles may be set by, for example, an administrator or may be determined based on particularities of characteristic information of the image(s). When an AR marker is to be captured from multiple angles, navigational information indicating the angles (or positions) from which the AR marker needs to be captured may be displayed on the terminal 12. Examples of the navigational information may include, but are not limited to, a marker frame that is displayed on a screen and in which an AR marker to be captured is placed, and an arrow indicating a direction of movement toward a capturing position.

Process of Setting Decision Criterion and AR Content: Second Embodiment

An exemplary process of setting a decision criterion and an AR content according to a second embodiment is described below. In the second embodiment, in addition to bright/dark area information (first characteristic information) described above, characteristic information (second characteristic information) of a physical object in a captured image is used as a decision criterion to change AR contents to be displayed.

Figure 20:
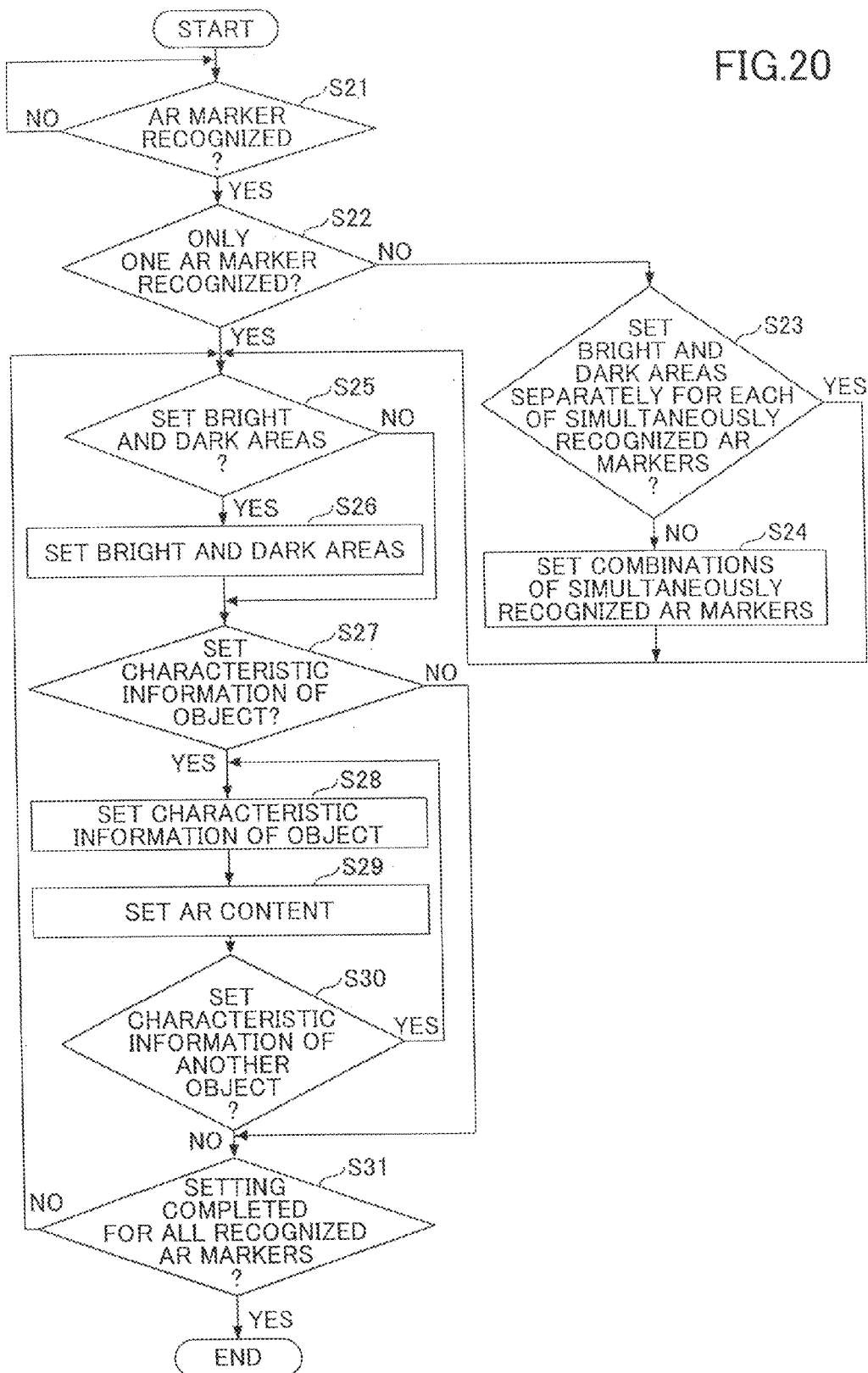
FIG. 20 is a flowchart illustrating an exemplary process of setting decision criteria and an AR content according to a second embodiment.

FIG. 20 is a flowchart illustrating an exemplary process of setting decision criteria and an AR content according to the second embodiment. In the example of FIG. 20, the recognition unit 36 of the terminal 12 determines whether an AR marker has been recognized in an image captured by a user such as an administrator or an operator (S21). When no AR marker has been recognized (NO at S21), the recognition unit 36 of the terminal 12 waits until an AR marker is recognized. When an AR marker(s) has been recognized (YES at S21), the setting unit 35 of the terminal 12 determines whether only one AR marker has been recognized (S22).

When more than one AR marker has been recognized (NO at S22), the setting unit 35 of the terminal 12 determines whether to set bright and dark areas separately for each of multiple AR markers recognized simultaneously (S23). When it is determined to not set bright and dark areas separately for each of the simultaneously recognized AR markers (NO at S23), the setting unit 35 of the terminal 12 sets one or more combinations of the simultaneously-recognized AR markers (S24). In this case, bright and dark areas are set for each of the combinations.

When it is determined to set bright and dark areas separately for each of the simultaneously recognized AR markers (YES at S23) or after step S24, the setting unit 35 of the terminal 12 determines whether to set bright and dark areas for each AR marker or each combination of AR markers (S25). When it is determined to set bright and dark areas (YES at S25), the setting unit 35 of the terminal 12 sets bright and dark areas for each AR marker or each combination of AR markers (S26). At step S26, the captured image is, for example, binarized, and bright and dark areas are set based on the binarized image.

When it is determined to not set bright and dark areas (NO at S25) or after step S26, the setting unit 35 of the terminal 12 determines whether to set characteristic information (second characteristic information) for an object(s) in the captured image (S37). When it is determined to set characteristic information for the object (YES at S27), the setting unit 35 of the terminal 12 sets characteristic information for the object (S28), and also sets an AR content (S29). At step S29, an AR content may be set for each of a case where both of decision criteria represented by the bright and dark areas and the characteristic information of the object are satisfied, a case where only one of the decision criteria is satisfied, and a case where neither of the decision criteria are satisfied.

Next, the setting unit 35 of the terminal 12 determines whether to set characteristic information for another object (S30). When it is determined to set characteristic information for another object (YES at S30), the setting unit 35 returns to step S28. When it is determined to not set characteristic information for an object (NO at S27) or when it is determined to not set characteristic information for another object (NO at S30), the setting unit 35 of the terminal 27 determines whether all of the recognized AR markers have been processed (S31). When not all of the recognized AR markers have been processed (NO at S31), the setting unit 35 of the terminal 12 returns to step S25. When all of the recognized AR markers have been processed (YES at S31), the setting unit 35 of the terminal 12 terminates the process.

<Exemplary Setting of Object Characteristic Information>

FIG. 21 is a drawing illustrating an exemplary setting of characteristic information of an object. In the example of FIG. 21, similarly to FIG. 8, one or both of a dark area and a bright area are set in a three-dimensional coordinate system (X, Y, Z) (marker coordinate system) having its origin at the center of the AR marker 90 (reference object) included in the captured image 100 captured by the terminal 12. Also in the example of FIG. 21, characteristic information of an object (physical object) 130 in the captured image 100 is set. The object 130 may be any object included in the captured image 100. For example, the object 130 may be an object for which an AR content is to be displayed. The coordinate system used to define bright and dark areas and characteristic information of an object is not limited to a three-dimensional coordinate system. For example, a two-dimensional coordinate system (X, Y) may instead be used.

In the example of FIG. 21, the object (PC) 130 in the captured image 100 is set as a criterion object used to determine whether an image has been captured at a correct position, and an object area (e.g., object coordinates) indicating an area where the object 130 is present and feature point information (e.g., feature point coordinates) of the object 130 are set. As a non-limiting example, the feature point information represents coordinates of one or more feature points of the object 130 obtained using an object recognition technique such as feature extraction or luminance difference extraction. Also, as the feature point information, a shape template corresponding to the criterion object may be set in advance.

In the second embodiment, when bright and dark areas and feature point information of a criterion object are set as characteristic information of the captured image 100, i.e., as decision criteria, an AR content 101 and its display position are set for each of a case where the decision criteria are satisfied and a case where the decision criteria are not satisfied. The display position may be defined by coordinates in a marker coordinate system relative to the center of the AR marker 90, or by coordinates in a screen coordinate system relative to a position in a captured image.

Examples of Data: Second Embodiment

Next, examples of data used in the second embodiment are described. FIGS. 22A through 22D are tables illustrating examples of data stored in the terminal 12 according to the second embodiment. FIGS. 23A through 23D are tables illustrating exemplary data stored in the server 11 according to the second embodiment.

FIG. 22A is an example of a data management table, FIG. 22B is an example of an AR content management table, FIG. 22C is an example of a bright/dark area management table, and FIG. 22D is an example of an object management table.

Fields of the data management table of FIG. 22A include, but are not limited to, "marker ID", "affirmative AR content ID", "negative AR content ID", "bright/dark area ID", and "object ID". Compared with the data management table of FIG. 9A, the data management table of FIG. 22A additionally includes the object ID field. The object ID field contains identification information (object IDs) of criterion objects.

Fields of the AR content management table of FIG. 22B include, but are not limited to, "AR content ID", "coordinates", "rotation angle", "magnification/reduction ratio", and "texture path". The fields of the AR content management table of FIG. 22B are substantially the same as those of the AR content management table of FIG. 9B.

Fields of the bright/dark area management table of FIG. 22C include, but are not limited to, "bright/dark area ID", "coordinates", and "bright/dark value". The fields of the bright/dark area management table of FIG. 22C are substantially the same as those of the bright/dark area management table of FIG. 9C.

Fields of the object management table of FIG. 22D include, but are not limited to, "object ID", "object coordinates", "affirmative AR content ID", and "feature point coordinates".

The object ID field contains identification information (object IDs) of criterion objects. The object coordinates field contains coordinates that define an area where a criterion object exists using, for example, a marker coordinate system. The affirmative AR content ID field contains identification information (affirmative AR content ID) of an AR content that is displayed when the result of a determination process based on characteristic information of a criterion object is affirmative. The feature point coordinates field contains feature point coordinates of feature points (which are obtained by an object recognition technique) of a criterion object associated with an object ID. The positions and the number of feature points may be specified by a user, and may vary depending on the object IDs. The object management table of FIG. 22D may also include a negative AR content ID field.

FIG. 23A is an example of a marker ID management table, FIG. 23B is an example of an AR content management table, FIG. 23C is an example of a bright/dark area management table, and FIG. 23D is an example of an object management table.

Fields of the marker ID management table of FIG. 23A include, but are not limited to, "marker ID", "affirmative AR content ID", "negative AR content ID", "bright/dark area ID", and "object ID". Compared with the marker ID management table of FIG. 10A, the marker ID management table of FIG. 23A additionally includes the object ID field. The object ID field contains identification information (object IDs) of criterion objects.

Fields of the AR content management table of FIG. 23B include, but are not limited to, "AR content ID", "coordinates", "rotation angle", "magnification/reduction ratio", and "texture path". The fields of the AR content management table of FIG. 23B are substantially the same as those of the AR content management table of FIG. 10B.

Fields of the bright/dark area management table of FIG. 23C include, but are not limited to, "bright/dark area ID", "coordinates", and "bright/dark value". The fields of the bright/dark area management table of FIG. 23C are substantially the same as those of the bright/dark area management table of FIG. 10C.

Fields of the object management table of FIG. 23D include, but are not limited to, "object ID", "object coordinates", "affirmative AR content ID", and "feature point coordinates".

The fields in FIGS. 23A through 23D contain information items that are stored in the corresponding fields of FIGS. 22A through 22D. The server 11 may manage those information items obtained from one or more terminals 12. In this case, the tables of FIGS. 23A through 23D may also include a field containing identification information of the terminals 12 that registered the information items.

Determination Process: Second Embodiment

Figure 24:
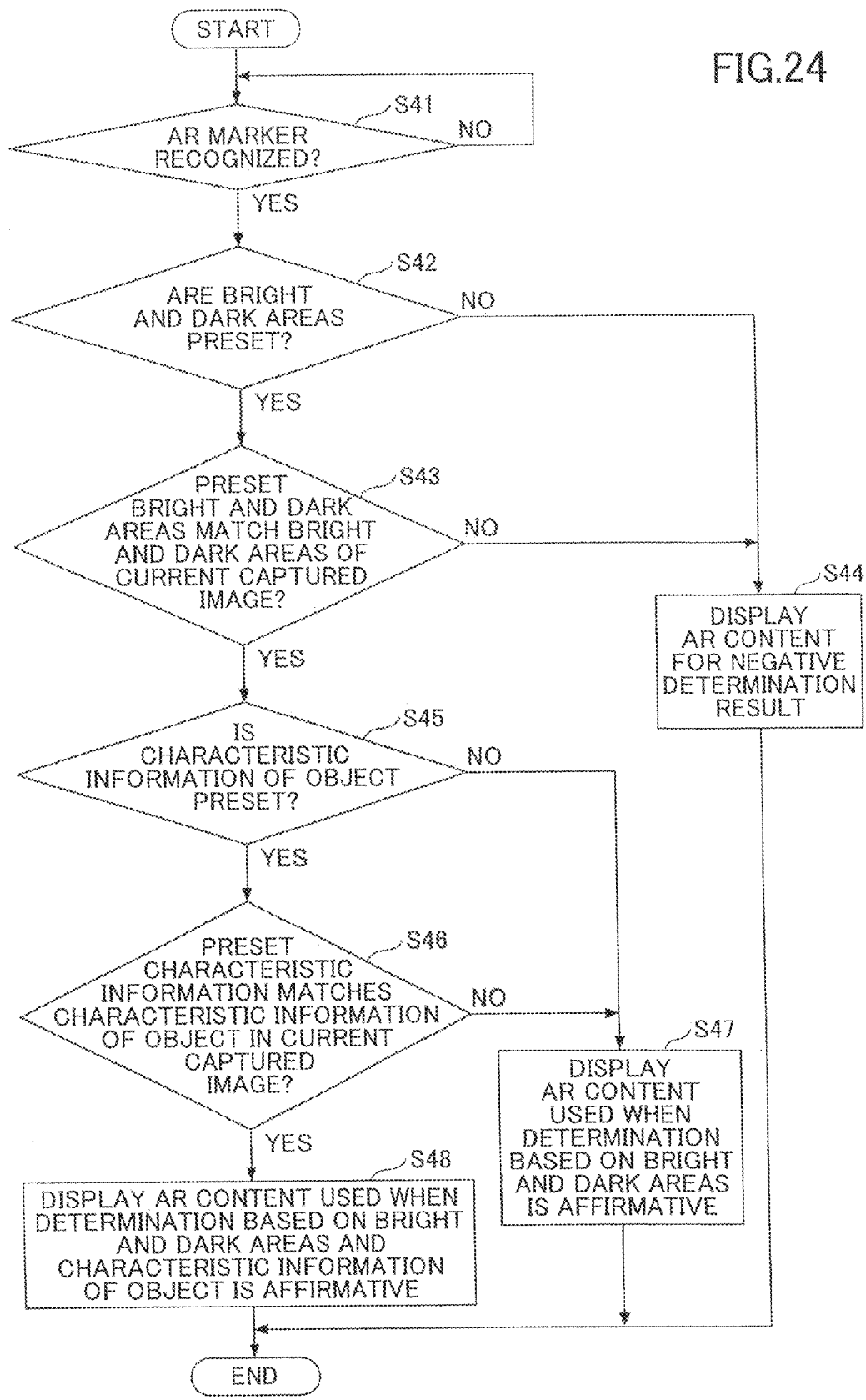
FIG. 24 is a flowchart illustrating an exemplary determination process according to the second embodiment.

FIG. 24 is a flowchart illustrating an exemplary determination process according to the second embodiment. In the example of FIG. 24, the recognition unit 36 of the terminal 12 determines whether the imaging unit 32 has started capturing an image, and whether an AR marker has been recognized in the image (current captured image) being captured (S41). When no AR marker has been recognized (NO at S41), the recognition unit 36 of the terminal 12 waits until an AR marker is recognized.

When an AR marker has been recognized (YES at S41), the determination unit 38 of the terminal 12 determines whether bright and dark areas have been preset (S42). Similarly to the first embodiment, whether bright and dark areas have been preset may be determined, for example, by querying the server 11 based on a marker ID obtained from the recognized AR marker to obtain decision criteria corresponding to the marker ID and determining whether the decision criteria include bright/dark area information.

When bright and dark areas have been preset (YES at S42), the determination unit 38 of the terminal 12 determines whether the preset bright and dark areas (first characteristic information) match current bright and dark areas of the current captured image (S43). In step S43, when the coordinates of feature points corresponding to the preset bright and dark areas (or the coordinates of the preset bright and dark areas) do not completely match those of the current bright and dark areas but their differences are within a predetermined allowable range, it may be determined that the preset bright and dark areas match the current bright and dark areas. Also in step S43, it may be determined that the preset bright and dark areas match the current bright and dark areas when the current bright and dark areas include the preset bright and dark areas.

When bright and dark areas have not been preset (NO at S42) or when the preset bright and dark areas do not match the current bright and dark areas (NO at S43), the terminal 42 displays an AR content that is generated by the image generation unit 40 and used when the result of determination is negative (S44). Alternatively, the terminal 12 may be configured to display no AR content at step S44.

When the preset bright and dark areas match the current bright and dark areas (YES at S43), the determination unit 38 of the terminal 12 determines whether object characteristic information has been preset (S45). The object characteristic information is, for example, but not limited to, feature point information of a physical object (criterion object) in a captured image. Whether object characteristic information has been preset may be determined, for example, by obtaining decision criteria from the server 11 and determining whether the obtained decision criteria include object characteristic information.

When object characteristic information has been preset (YES at S45), the determination unit 38 of the terminal 12 determines whether the preset object characteristic information (second characteristic information) matches current object characteristic information of the current captured image (S46). As a non-limiting example, whether the preset object characteristic information matches the current object characteristic information may be determined by comparing the coordinates of feature points in the preset object characteristic information with the coordinates of feature points in the current object characteristic information, and determining whether differences between the coordinates of the feature points are within a predetermined allowable range. Also at step S46, when the current object characteristic information includes the preset object characteristic information, it may be determined that the preset object characteristic information matches the current preset object characteristic information.

The determination unit 38 of the terminal 12 of the present embodiment is configured to perform object recognition only in a predetermined object area of an image to obtain object characteristic information. Compared with a case where the determination unit 38 performs object recognition in the entire image, the configuration of the present embodiment makes it possible to more quickly obtain object characteristic information.

When object characteristic information has not been preset (NO at S45) or when the preset object characteristic information does not match the current object characteristic information (NO at S46), the terminal 12 displays an AR content that is generated by the image generation unit 40 and used when the result of determination performed based on bright and dark areas is affirmative (S47). When the preset object characteristic information matches the current object characteristic information (YES at S46), the terminal 12 displays an AR content that is generated by the image generation unit 40 and used when the result of determination based on bright and dark areas and object characteristic information is affirmative (S48).

The above process makes it possible to perform a determination process based on bright/dark area information of an area surrounding a captured AR marker and characteristic information of a criterion object, and thereby makes it possible to provide a user with proper information (e.g., AR contents) corresponding to the captured AR marker. Thus, the second embodiment makes it possible to prevent inappropriate output of superimposed information and to control output of superimposed information on site, by using a marker ID, bright/dark area information of a background image of an AR marker, and a criterion object for switching types of superimposed information. Accordingly, the second embodiment makes it possible to prevent superimposed information from being output based on an unauthorized copy of an AR marker and unauthorized use of a system.

Display Screens: Second Embodiment

Figure 25:
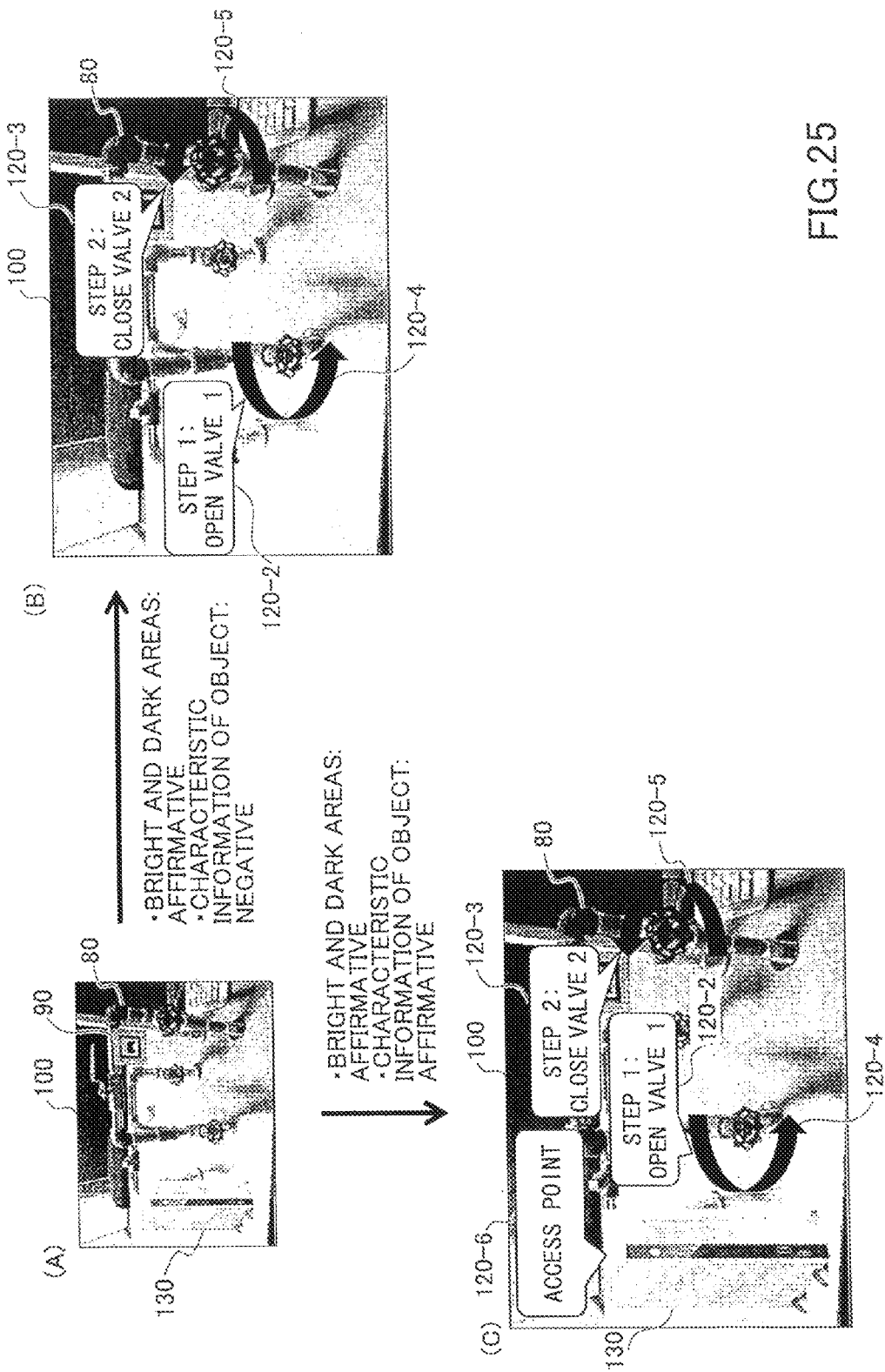
FIG. 25 is a drawing illustrating exemplary display screens according to the second embodiment.

FIG. 25 is a drawing illustrating exemplary display screens according to the second embodiment. FIG. 25 (A) is an example of a captured image captured by the terminal 12. When the terminal 12 recognizes the AR marker 90 attached to the pipe 80 (an example of an object for which an AR content(s) is to be displayed), the terminal 12 sends a marker ID of the AR marker 90 to the server 11, and obtains decision criteria and an AR content(s) corresponding to the marker ID. Alternatively, the AR content(s) corresponding to the marker ID may be stored in the terminal 12 in advance. Also, instead of the server 11, the terminal 12 may determine the AR content(s) corresponding to the marker ID, and retrieve the AR content(s) stored in the terminal 12. Decision criteria used in the second embodiment include bright/dark area information and characteristic information (object characteristic information) of a criterion object (physical object).

Next, the terminal 12 performs determination processes based on the obtained decision criteria. When both of the results of the determination processes based on the bright/dark area information and the object characteristic information are negative, an error message (AR content 120-1) as exemplified by FIG. 16 (B) is displayed on a screen. When the result of the determination process based on the bright/dark area information is affirmative and the result of the determination process based on the object characteristic information is negative, AR contents 120-2 through 120-5 associated with the AR marker 90 are superimposed on the captured image 100 and displayed as illustrated by FIG. 25 (B). In this case, no AR content is displayed for the criterion object 130.

When both of the results of the determination processes based on the bright/dark area information and the object characteristic information are affirmative, an AR content 120-6 associated with the criterion object 130 is displayed together with the AR contents 120-2 through 120-5 associated with the AR marker 90 as illustrated by FIG. 25 (C).

As a variation of FIG. 25 (B), the terminal 12 may be configured to not display AR contents for the affirmative determination result unless both of the results of the determination processes based on the bright/dark area information and the object characteristic information are affirmative.

AR contents to be displayed are not limited to those described above. For example, schedule information may be displayed depending on the time period when a determination process is performed. Also, user-specific information may be displayed depending on user identification information.

Thus, the second embodiment makes it possible to prevent output of superimposed information (AR contents) when an AR marker is recognized but decision criteria are not satisfied, by using a marker ID, bright/dark area information of a background image of the AR marker, and a criterion object for switching types of superimposed information.

The present invention is not limited to the first and second embodiments described above. For example, parts or all of the first and second embodiments may be combined. Also, although bright/dark area information and object characteristic information are used as decision criteria in the second embodiment to determine whether an AR maker has been captured at a correct position, the determination may be performed based only on the object characteristic information.

Characteristic information of an image is not limited to bright/dark area information and object characteristic information as described above. For example, information indicating whether an area with a luminance value greater than a threshold exists in an image, the number of bright or dark areas in an image, information indicating whether an area having uniform luminance exists in an image, or a combination of these criteria may be used as the bright/dark area information. Also, the number of objects in an image, the size of an object, the shape of an object, or a combination of these criteria may be used as the object characteristic information.

As described above, embodiments of the present invention make it possible to properly control display of superimposed information. For example, when an AR marker is recognized by the terminal 12, a determination process is performed to determine whether image information, which is obtained when the AR marker is recognized, matches characteristics (e.g., bright/dark area information and/or feature point information) of an image that is captured in advance and includes the AR marker, and output of superimposed information associated with the AR marker is controlled based on the result of the determination process (e.g., whether to output the superimposed information and what type of superimposed information is output). The determination process may be performed either at the terminal 12 or the server 11.

In the above embodiments, bright/dark area information obtained through a simple binarization process is used to switch types of superimposed information. This in turn makes it possible to reduce the complexity of a process for switching types of superimposed information. Also, by using a criterion object, it is possible to more flexibly control display of superimposed information. Further, using feature point information makes it possible to reduce the processing load in recognizing an object.

Thus, by using a marker ID, bright/dark area information of a background image of an AR marker, and a criterion object for controlling output of superimposed information, it possible to prevent output of superimposed information (AR contents) when an AR marker is recognized but decision criteria are not satisfied. Also, the above embodiments make it possible to prevent superimposed information from being output based on an unauthorized copy of an AR marker and unauthorized use of a system. Further, the above embodiments make it possible to properly control display of superimposed information based on object characteristic information and bright/dark area information that vary depending on the environment where an AR maker is located.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal, comprising:
   a processor configured to execute a process including
   capturing a first input image including a reference object and a first background image surrounding the reference object,
   performing image recognition on the captured first input image to obtain identification information of the reference object,
   obtaining characteristic information registered in association with the identification information of the reference object, wherein the obtained characteristic information is characteristic information of a second background image of a second input image, the second input image including the reference object and the second background image surrounding the reference object, and wherein the characteristic information of the second background image is registered in association with the identification information of the reference object prior to capturing the first input image,
   determining whether characteristic information of the first background image of the first input image matches the obtained characteristic information of the second background image of the second input image, and
   generating an image in which a content associated with the identification information of the reference object is superimposed on the first input image based on a result of the determining that the characteristic information of the first background image matches the characteristic information of the second background image.

2. The terminal as claimed in claim 1, wherein the process further includes determining whether feature point information of an object in the first input image matches feature point information of the object in the second input image.

3. The terminal as claimed in claim 1, wherein the determining whether the characteristic information of the first background image matches the characteristic information of the second background image is performed using multiple sets of the characteristic information of first background images of first input images that include the reference object and are captured from different directions.

4. The terminal as claimed in claim 1, wherein the determining whether the characteristic information of the first background image matches the characteristic information of the second background image is performed using the characteristic information of the second background image that is set in association with the identification information of the reference object and time information.

5. The terminal as claimed in claim 4, wherein the image is generated by superimposing, on the first input image, the content that is associated with the identification information of the reference object and the time information based on the result of the determining that the characteristic information of the first background image matches the characteristic information of the second background image.

6. The terminal as claimed in claim 1, wherein the characteristic information of each of the first background image and the second background image is brightness/darkness information of the each of the first background image and the second background image.

7. An information processing apparatus, comprising:
   a processor configured to execute a process including
   receiving, from a terminal, a first input image including a reference object and a first background image surrounding the reference object,
   performing image recognition on the received first input image to obtain identification information of the reference object,
   obtaining characteristic information registered in association with the identification information of the reference object, wherein the obtained characteristic information is characteristic information of a second background image of a second input image, the second input image including the reference object and the second background image surrounding the reference object, and wherein the characteristic information of the second background image is registered in association with the identification information of the reference object prior to receiving the first input image from the terminal,
   determining whether characteristic information of the first background image of the first input image matches characteristic information of the second background image of the second input image,
   extracting a content associated with the identification information of the reference object based on a result of the determining, and
   sending the extracted content to the terminal.

8. A method performed by a terminal, the method comprising:
   capturing a first input image including a reference object and a first background image surrounding the reference object;
   performing image recognition on the captured first input image to obtain identification information of the reference object,
   obtaining characteristic information registered in association with the identification information of the reference object, wherein the obtained characteristic information is characteristic information of a second background image of a second input image, the second input image including the reference object and the second background image surrounding the reference object, and wherein the characteristic information of the second background image is registered in association with the identification information of the reference object prior to capturing the first input image, determining whether characteristic information of the first background image of the first input image matches characteristic information of the second background image of the second input image; and generating an image in which a content associated with the identification information of the reference object is superimposed on the first input image based on a result of the determining that the characteristic information of the first background image matches the characteristic information of the second background image.

9. A non-transitory computer-readable storage medium having a program stored therein for causing a computer to perform a method, the method comprising:

capturing a first input image including a reference object and a first background image surrounding the reference object;

performing image recognition on the captured first input image to obtain identification information of the reference object, obtaining characteristic information registered in association with the identification information of the reference object, wherein the obtained characteristic information is characteristic information of a second background image of a second input image, the second input image including the reference object and the second background image surrounding the reference object, and wherein the characteristic information of the second background image is registered in association with the identification information of the reference object prior to capturing the first input image, determining whether characteristic information of the first background image of the first input image matches characteristic information of the second background image of the second input image; and generating an image in which a content associated with the identification information of the reference object is superimposed on the first input image based on a result of the determining that the characteristic information of the first background image matches the characteristic information of the second background image.

\* \* \* \* \*